(12) United States Patent
Subramaniam et al.

(10) Patent No.: US 11,710,859 B2
(45) Date of Patent: Jul. 25, 2023

(54) TECHNIQUES FOR CONTROLLING CHARGING AND/OR DISCHARGING OF BATTERIES USING A TANKS-IN-SERIES MODEL

(71) Applicants: University of Washington, Seattle, WA (US); BattGenie Inc., Seattle, WA (US)

(72) Inventors: Akshay Subramaniam, Seattle, WA (US); Suryanarayana Kolluri, Austin, TX (US); Caitlin Parke, Seattle, WA (US); Manan Pathak, Seattle, WA (US); Venkat Subramanian, Austin, TX (US)

(73) Assignees: University of Washington, Seattle, WA (US); BattGenie Inc., Seattle, WA (US)

( * ) Notice: Subject to any disclaimer, the term of this patent is extended or adjusted under 35 U.S.C. 154(b) by 183 days.

(21) Appl. No.: 17/029,909

(22) Filed: Sep. 23, 2020

(65) Prior Publication Data

US 2021/0091418 A1    Mar. 25, 2021

Related U.S. Application Data

(60) Provisional application No. 62/905,942, filed on Sep. 25, 2019.

(51) Int. Cl.
*H01M 10/42* (2006.01)
(52) U.S. Cl.
CPC .. *H01M 10/425* (2013.01); *H01M 2010/4271* (2013.01); *H01M 2010/4278* (2013.01)

(58) Field of Classification Search
CPC ............. H01M 10/0525; H01M 10/42; H01M 10/425; H01M 10/4285; H01M 10/48;
(Continued)

(56) References Cited

U.S. PATENT DOCUMENTS 10,302,704 B2    5/2019  Hariharan et al.
10,471,847 B1    11/2019 Han et al.
(Continued)

OTHER PUBLICATIONS

Wang, C.Y., et al., "Computational battery dynamics (CBD)—electrochemical/thermal coupled modeling and multi-scale modeling", Journal of Power Sources, 2002, 110, 364-376.
(Continued)

*Primary Examiner* — Ula C Ruddock
(74) *Attorney, Agent, or Firm* — Christensen O'Connor Johnson Kindness PLLC

(57) ABSTRACT

In some embodiments, a battery management system is provided. The battery management system comprises a connector for electrically coupling a battery to the battery management system, at least one sensor configured to detect a battery state, a programmable chip configured to control at least one of charging and discharging of the battery, and a controller device. The controller device is configured to receive at least one battery state from the at least one sensor; provide the at least one battery state as input to a tanks-in-series model that represents the battery; and provide at least one output of the tanks-in-series model to the programmable chip for controlling at least one of charging and discharging of the battery.

20 Claims, 7 Drawing Sheets

(58) Field of Classification Search
CPC ....... H01M 10/486; H01M 2010/4271; H01M 2010/4278; Y02E 60/10
See application file for complete search history.

(56) References Cited

U.S. PATENT DOCUMENTS

2015/0285869 A1* 10/2015 Wada ............... H01M 10/4285
702/63
2018/0097396 A1* 4/2018 Qi ..................... H01M 4/139

OTHER PUBLICATIONS

Haran, B.S., "Determination of the hydrogen diffusion coefficient in metal hydrides by impedance spectroscopy", Journal of Power Sources, 1998, 75, 56-63.
Guo, M., et al., "Single-Particle Model for a Lithium-Ion Cell: Thermal Behavior", J. Electrochem. Soc., 2011, 158(2), A122-A132.
Dao, T.S., et al., "Simplification and order reduction of lithium-ion battery model based on porous-electrode theory", Journal of Power Sources, 2012, 198, 329-337.
Zhang, Q., et al., "Comparison of approximate solution methods for the solid phase diffusion equation in a porous electrode model", Journal of Power Sources, 2007, 165, 880-886.
Lawder, M.T., et al., "Model-Based SEI Layer Growth and Capacity Fade Analysis for EV and PHEV Batteries and Drive Cycles", J. Electrochem. Soc., 2014, 161(14), A2099-A2108.
Wandt, J., et al., "Quantitative and time-resolved detection of lithium plating on graphite anodes in lithium ion batteries", Materials Today, 2018, 21(3), 231-240.
Reniers, J.M., et al., "Review and Performance Comparison of Mechanical-Chemical Degradation Models for Lithium-Ion Batteries", J. Electrochem. Soc., 2019, 166(14), A3189-A3200.
Bandhauer, T.M., et al., "A Critical Review of Thermal Issues in Lithium-Ion Batteries", J. Electrochem. Soc., 2011, 158(3), R1-R25.
Tippmann, S., et al., "Low-temperature charging of lithium-ion cells part I: Electrochemical modeling and experimental investigation of degradation behavior", Journal of Power Sources, 2014, 252, 305-316.
Ahmed, S., et al., "Enabling fast charging—A battery technology gap assessment", Journal of Power Sources, 2017, 367, 250-262.
Hosseinzadeh, E., et al., "Combined electrical and electrochemical-thermal model of parallel connected large format pouch cells", Journal of Energy Storage, 2019, 22, 194-207.
Shi, W., et al., "Effects of imbalanced currents on large-format LiFePO4/graphite batteries systems connected in parallel", Journal of Power Sources, 2016, 313, 198-204.
Lee, K.J., et al., "Three dimensional thermal-, electrical-, and electrochemical-coupled model for cylindrical wound large format lithium-ion batteries", Journal of Power Sources, 2013, 241, 20-32.
Samadi, M.F., et al., "Nonlinear Model Predictive Control for Cell Balancing in Li-ion Battery Packs", 2014 American Control Conference (ACC), 2014, 6 pages.
Ganesan, N., et al., "Physics based modeling of a series parallel battery pack for asymmetry analysis, predictive control and life extension", Journal of Power Sources, 2016, 322, 57-67.
Wu, B., et al., "Coupled thermal-electrochemical modelling of uneven heat generation in lithium-ion battery packs", Journal of Power Sources, 2013, 243, 544-554.
Forgez, C., et al., "Thermal modeling of a cylindrical LiFePO4/graphite lithium-ion battery", Journal of Power Sources, 2010, 195, 2961-2968.
Kosch, S., et al., "An extended polarization model to study the influence of current collector geometry of large-format lithium-ion pouch cells", Journal of Power Sources, 2017, 342, 666-676.
Kosch, S., et al., "A Computationally Efficient Multi-Scale Model for Lithium-Ion Cells", J. Electrochem. Soc., 2018, 165(10), A2374-A2388.

Bazinski, S.J., et al., "Thermal Effect of Cooling the Cathode Grid Tabs of a Lithium-Ion Pouch Cell", J. Electrochem. Soc., 2014, 161(14), A2168-A2174.
Ye, Y., et al., "Effect of thermal contact resistances on fast charging of large format lithium ion batteries", Electrochimica Acta, 2014, 134, 327-337.
Kim, G.H., et al., "Multi-Domain Modeling of Lithium-Ion Batteries Encompassing Multi-Physics in Varied Length Scales", J. Electrochem. Soc., 2011, 158(8), A955-A969.
Tran, N.T., et al., "A Computationally Efficient Coupled Electrochemical-Thermal Model for Large Format Cylindrical Lithium Ion Batteries", J. Electrochem. Soc., 2019, 166(13), A3059-A3071.
Guo, M., et al., "A distributed thermal model for a Li-ion electrode plate pair", Journal of Power Sources, 2013, 221, 334-344.
Gerver, R.E., et al., "Three-Dimensional Modeling of Electrochemical Performance and Heat Generation of Lithium-Ion Batteries in Tabbed Planar Configurations", J. Electrochem Soc., 2011, 158(7), A835-A843.
Smith, K.A., et al., "Control oriented 1D electrochemical model of lithium ion battery", Energy Conversion and Management, 2007, 48, 2565-2578.
Smith, K., et al., "Power and thermal characterization of a lithium-ion battery pack for hybrid-electric vehicles", Journal of Power Sources, 2006, 160, 662-673.
Li, J., et al., "An electrochemical-thermal model based on dynamic responses for lithium iron phosphate battery", Journal of Power Sources, 2014, 255, 130-143.
Ji, Y., et al., "Li-Ion Cell Operation at Low Temperatures", J. Electrochem. Soc., 2013, 160(4), A636-A649.
Pals, C.R., et al.,"Thermal Modeling of the Lithium/Polymer Battery I. Discharge Behavior of a Single Cell", J. Electrochem Soc., 1995, 142(10), 3274-3281.
Pals, C.R., et al.,"Thermal Modeling of the Lithium/Polymer Battery II. Temperature Profiles in a Cell Stack", J. Electrochem Soc., 1995, 142(10), 3282-3288.
Subramaniam, A., et al., "Properly Lumped Lithium-ion Battery Models: A Tanks-in-Series Approach", J. Electrochem Soc., 2020,167, 19 pages.
Rao, L., et al., "Heat-Generation Rate and General Energy Balance for Insertion Battery Systems", J. Electrochem. Soc., 1997, 144(8), 2697-2704.
Bernardi, D., et al., "A General Energy Balance for Battery Systems", 1985, J. Electrochem. Soc., 132(1), 5-12.
Kumaresan, K., et al., "Thermal Model for a Li-Ion Cell", J. Electrochem. Soc., 2008, 155(2), A164-A171.
Yang, N., et al., "Unbalanced discharging and aging due to temperature differences among the cells in a lithium-ion battery pack with parallel combination", Journal of Power Sources, 2016, 306, 733-741.
Lei, Z., et al., "Preheating method of lithium-ion batteries in an electric vehicle", J. Mod. Power Syst. Clean Energy, 2015, 3(2), 289-296.
Ouyang, D., et al., "Influence of low temperature conditions on lithium-ion batteries and the application of an insulation material", RSC Adv., 2019, 9, 9053-9066.
Lai, Y., et al., "Insight into heat generation of lithium ion batteries based on the electrochemical-thermal model at high discharge rates", International Journal of Hydrogen Energy, 2015, 40, 13039-13049.
Mao, J., et al., "Simulation of temperature rise in Li-ion cells at very high currents", Journal of Power Sources, 2014, 271, 444-454.
Tanim, T.R., "State of charge estimation of a lithium ion cell based on a temperature dependent and electrolyte enhanced single particle model", Energy, 2015, 80, 731-739.
Moyles, I.R., et al., "Asymptotic Reduction of a Porous Electrode Model for Lithium-Ion Batteries", Siam J. Appl. Math., 2019, 79(4), 1528-1549.
Amiribavandpour, P., et al., "An improved theoretical electrochemical-thermal modelling of lithium-ion battery packs in electric vehicles", Journal of Power Sources, 2015, 284, 328-338.
Subramaniam, A., et al., "A Mass and Charge—Conserving Tanks-in-Series Model for Lithium-ion Batteries", Presented May 30, 2019 at 235th ECS Meeting in Dallas, Texas, 2019, 17 pages.

(56) References Cited

OTHER PUBLICATIONS

Goldie-Scot, L., "A Behind the Scenes Take on Lithium-ion Battery Prices", <https://about.bnef.com/blog/behind-scenes-take-lithium-ion-battery-prices/>, 2019, 5 pages.

Chaturvedi, N. A., et al., "Algorithms for Advanced Battery-Management Systems", IEEE Control Systems Magazine, 2010, 49-68.

Lin, X., et al., "Modeling and Estimation for Advanced Battery Management", Annual Review of Control, Robotics, and Autonomous Systems, 2019, 2:393-426.

Pathak, M., et al., "Analyzing and Minimizing Capacity Fade through Optimal Model-based Control—Theory and Experimental Validation", ECS Trans., 2017, 75(23), 51-75.

Doyle, M., et al., "Modeling of Galvanostatic Charge and Discharge of the Lithium/Polymer/Insertion Cell", J. Electrochem. Soc., 1993, 140(6), 1526-1533.

Northrop, P.W.C., et al., "Coordinate Transformation, Orthogonal Collocation, Model Reformulation and Simulation of Electrochemical-Thermal Behavior of Lithium-Ion Battery Stacks", J. Electrochem. Soc., 2011,158(12), A1461-A1477.

Bizeray, A.M., et al., "Lithium-ion battery thermal-electrochemical model-based state estimation using orthogonal collocation and a modified extended Kalman filter", Journal of Power Sources, 2015, 296, 400-412.

Jokar, A., et al., "Review of simplified Pseudo-two-Dimensional models of lithium-ion batteries", Journal of Power Sources, 2016, 327, 44-55.

Atlung, S., et al., "Dynamic Aspects of Solid Solution Cathodes for Electrochemical Power Sources", J. Electrochem Soc., 1979, 126(8), 1311-1321.

Ramadesigan, V., et al., "Modeling and Simulation of Lithium-Ion Batteries from a Systems Engineering Perspective", J. Electrochem Soc., 2012, 159(3), R31-R45.

Santhanagopalan, S., et al., "Review of models for predicting the cycling performance of lithium ion batteries", Journal of Power Sources, 2006, 156, 620-628.

Perez, H.E., et al., "Optimal Charging of Li-Ion Batteries via a Single Particle Model with Electrolyte and Thermal Dynamics", J. Electrochem Soc., 2017, 164(7), A1679-A1687.

Santhanagopalan, S., et al., "Online estimation of the state of charge of a lithium ion cell", Journal of Power Sources, 2006, 161, 1346-1355.

Subramanian, V., et al., "Efficient Macro-Micro Scale Coupled Modeling of Batteries", J. Electrochem Soc., 2005, 152(10), A2002-A2008.

Ramadesigan, V., et al., "Efficient Reformulation of Solid-Phase Diffusion in Physics-Based Lithium-Ion Battery Models", J. Electrochem Soc., 2010, 157(7), A854-A860.

Doyle, M., et al., "Analysis of capacity-rate data for lithium batteries using simplified models of the discharge process", Journal of Applied Electrochemistry, 1997, 27, 846-856.

Fuller, T.F., et al., "Simulation and Optimization of the Dual Lithium Ion Insertion Cell", J. Electrochem. So., 1994, 141(1), 1-10.

Marquis, S, G., et al., "An Asymptotic Derivation of a Single Particle Model with Electrolyte", J. Electrochem Soc., 2019, 166(15), A3693-A3706.

Richardson, G., et al., "Generalised single particle models for high-rate operation of graded lithium-ion electrodes systematic derivation and validation", arXiv:1907.09410v1 [physics.chem-ph], 2019, 1-31.

Subramanian, V., et al., "Mathematical Model Reformulation for Lithium-Ion Battery Simulations: Galvanostatic Boundary Conditions", J. Electrochem Soc., 2009, 156(4), A260-A271.

Northrup, P.W.C., et al., "Efficient Simulation and Model Reformulation of Two-Dimensional Electrochemical Thermal Behavior of Lithium-Ion Batteries", J. Electrochem Soc., 2015, 162(6), A940-A951.

Ramadesigan, V., et al., "Parameter Estimation and Capacity Fade Analysis of Lithium-Ion Batteries Using Reformulated Models", J. Electrochem Soc., 2011, 158(9), A1048-A1054.

Northrup, P.W.C., et al., "Efficient Simulation and Reformulation of Lithium-Ion Battery Models for Enabling Electric Transportation", J. Electrochem Soc., 2014, 161(8), E3149-E3157.

Deng, Z., et al., "Polynomial Approximation pseudo-two-dimensional battery model for online application in embedded battery management system", Energy, 2018, 142, 838-850.

Rahimian, S.K., et al., "Extension of physics-based single particle model for higher charge-discharge rates", Journal of Power Sources, 2013, 224, 180-194.

Luo, W., et al., "A new extension of physics-based single particle model for higher charge-discharge rates", Journal of Power Sources, 2013, 241, 295-310.

Sharma, A.K., et al., "A Closed Form Reduced Order Electrochemical Model for Lithium-Ion Cells", J. Electrochem Soc., 2019, 166(6), A1197-A1210.

Han, X., et al., "Simplification of physics-based electrochemical model for lithium ion battery on electric vehicle. Part II: Pseudo-two-dimensional model simplification and state of charge estimation", Journal of Power Sources, 2015, 278, 814-825.

Moura, S.J., et al., "Battery State Estimation for a Single Particle Model With Electrolyte Dynamics", IEEE Transactions on Control Systems Technology, 2017, 25(2), 453-468.

Guduru, A., "Analytical solution for electrolyte concentration distribution in lithium-ion batteries", J. Appl. Electrochem , 2012, 42:189-199.

Baba, N., et al., et al., "Numerical simulation of thermal behavior of lithium-ion secondary batteries using the enhanced single particle model", Journal of Power Sources, 2014, 252, 214-228.

Tanim, T. R., et al., "A Temperature Dependent, Single Particle, Lithium Ion Cell Model Including Electrolyte Diffusion", Journal of Dynamic Systems, Measurement, and Control, 2015, 137, 11 pages.

Shi, Y., et al., "Discretization Methods for Battery Systems Modeling", 2011 American Control Conference, 2011, 6 pages.

Kemper, P., et al., "Simplification of pseudo two dimensional battery model using dynamic profile of lithium concentralion", Journal of Power Sources, 2015, 286, 510-525.

Kumar, V. Senthil., "Reduced order model for a lithium ion cell with uniform reaction rate approximation", Journal of Power Sources, 2013, 222, 426-441.

Newman, J., et al., "Porous-Electrode Theory with Battery Applications", Submitted to American Institute of Chemical Engineers Journal, 1974, 86 pages.

Zeng, Y., "Phase Separation Dynamics in Isotropic Ion-Intercalation Particles", Siam J. Appl. Math., 2014, 74(4), 980-1004.

Baker, D.B., et al., "Intercalate Diffusion in Multiphase Electrode Materials and Application to Lithiated Graphite", J. Electrochem. Soc., 2012, 159(8), A1341-A1350.

Subramanian, V., et al., "Approximate Solutions for Galvanostatic Discharge of Spherical Particles I. Constant Diffusion Coefficient", J. Electrochem. Soc., 2001, 148(11), E444-E449.

Valoen, L.O., et al., "Transport Properties of LiPF6-Based Li-Ion Battery Electrolytes", J. Electrochem. Soc., 2005, 152(5), A882-A891.

Gu, W.B., et al., "Micro-Macroscopic Coupled Modeling of Batteries and Fuel Cells II. Application to Nickel-Cadmium and Nickel-Metal Hydride Cells", J. Electrochem Soc., 1998, 145(10), 3418-3426.

Kemper, P., et al., "Extended Single Particle Model of Li-Ion Batteries Towards High Current Applications", 9th IEEE Veh. Power Propuls. Conf., 2013, 6 pages.

Subramanian, V., et al., "Toward Real-Time Simulation of Physics Based Lithium-Ion Battery Models", Electrochem. Solid-State Lett., 2007, 10(11), A255-A260.

Lawder, M.T., et al., "Extending explicit and linearly implicit ODE solvers for index-1 DAEs", Computers and Chemical Engineering, 2015, 82, 283-292.

Maple Product Information, <https://maplesoft.com/products/maple/>.

Fuller, T.F., et al., "Relaxation Phenomena in Lithium-Ion-Insertion Cells", J. Electrochem. Soc., 1994, 141(4), 982-990.

(56) References Cited

OTHER PUBLICATIONS

Ohzuku, T., et al., "Formation of Lithium-Graphite Intercalation Compounds in Nonaqueous Electrolytes and Their Application as a Negative Electrode for a Lithium Ion (Shuttlecock) Cell", J. Electrochem. Soc., 1993, 140(9), 2490-2498.
Danner, T., et al., "Thick electrodes for Li-ion batteries: A model based analysis", Journal of Power Sources, 2016, 334, 191-201.
Singh, M., et al., "Thick Electrodes for High Energy Lithium Ion Batteries", J. Electrochem. Soc., 2015, 162(7), A1196-A1201.
Jiang, F., et al., "Elucidating the Performance Limitations of Lithium-ion Batteries due to Species and Charge Transport through Five Characteristic Parameters", Scientific Reports, 2016, 6:32639, 1-18.

\* cited by examiner

TECHNIQUES FOR CONTROLLING CHARGING AND/OR DISCHARGING OF BATTERIES USING A TANKS-IN-SERIES MODEL

CROSS-REFERENCE TO RELATED APPLICATION

This application claims the benefit of Provisional Application No. 62/905,942, filed Sep. 25, 2019, the entire disclosure of which is hereby incorporated by reference for all purposes.

STATEMENT OF GOVERNMENT LICENSE RIGHTS

This invention was made with government support under Grant No. DE-AR0000275, awarded by the U.S. Department of Energy. The government has certain rights in the invention.

BACKGROUND

Lithium-ion batteries are achieving increasing ubiquity with the emphasis on renewable energy and electric transportation to address greenhouse gas pollution. Material and manufacturing innovations, coupled with market pressures and economies of scale, have led to declines in battery pack costs of nearly 85% in the period 2010-18. An important factor towards enabling further reductions in cost metrics is the efficient operation of battery systems. This entails maximizing utilization, reducing overdesign, enabling fast charging, and mitigating degradation phenomena. Thermal runaway and the resulting likelihood of fires and explosions is another critical consideration, and it is essential to ensure battery operation in the safe temperature range. The Battery Management System (BMS) is the combination of hardware and software components that performs the requisite functions to ensure safe and efficient operation. An accurate and robust mathematical model is essential for BMS, which estimates battery state variables such as State of Charge (SoC), State of Health (SoH), and temperature.

The incorporation of sophisticated electrochemical models has the potential to enable more powerful and intelligent BMS. In addition to improved prediction of battery states, variables internal to battery electrochemistry allow the formulation of more complete optimization and control problems than would be possible by simple circuit models. Achieving this integration requires the reduction of the computational demands of complex models, such as the macro-homogeneous p2D models of Newman and co-workers. In addition to model reformulation techniques that exploit the underlying mathematical structure of the equations to achieve fast simulation, the tradeoff between accuracy and computational efficiency has spurred active investigation into simplifications of the p2D model subject to limiting assumptions.

Since its introduction by Atlung et al., the Single Particle Model (SPM) has been extensively used for efficient simulation, estimation, optimal charging and life-cycle modeling. The SPM visualizes the electrodes in a lithium-ion battery as two representative spherical particles and considers the electrode reactions and transport through the active particle. SPM is particularly attractive since the largest reduction in the number of equations is achieved via simplifications of the solid phase, given that the corresponding equation is solved at each point in the electrode computational grid. Importantly, however, it neglects potential and concentration variations in the electrolyte phase, which limits its predictive ability to low-current scenarios and relatively thin electrodes, where liquid phase polarizations can be neglected.

In addition, SPM assumes a uniform reaction distribution throughout each electrode, which is only attained at moderate currents in which kinetic resistances dominate ohmic effects, and in electrodes which possess a monotonic dependence of equilibrium potential with degree of lithiation. SPM has been recovered in the limits of fast diffusion dynamics with respect to characteristic discharge time.

The p2D model also returns SPM in the limit of large changes in characteristic overpotential upon Li intercalation, which results in uniform reaction distributions. These limitations have led to efforts to expand the applicability of SPM by introducing simplified descriptions of electrolyte dynamics and non-uniform reaction distributions.

In past work by the inventors of the present disclosure, model reformulation techniques have been used. Millisecond computation times were achieved using coordinate transformation, spectral methods and reformulation enabled by analytical solution, and successfully demonstrated in applications for parameter estimation, optimal control, and BMS. Despite detailed analysis and comparisons of efficient simulations of SPM-like models in past work, the two and three-parameter models have been arguably the most widely used for control, optimization and BMS by the community at large. This motivates the development of efficient models for the electrolyte phase in lithium-ion batteries.

A common approach for the inclusion of non-uniform reaction distributions is to directly assume a polynomial profile for pore-wall flux. Alternatively, polynomial profiles for both electrolyte concentration and potential may be assumed and used to determine the spatial variation of the pore-wall flux. In addition, some workers have derived closed-form analytical solutions for the pore-wall flux distribution. However, these solutions are only valid under certain assumptions, such as linear kinetics, or by neglecting the diffusional contribution to the electrolyte current, and also neglect the concentration-dependence of one or more electrolyte transport properties. Still other approaches assume a polynomial or exponential dependence for the equilibrium electrode potential in space. These assumed profiles are often combined with polynomial spatial dependence for other electrochemical variables, converting the original Partial Differential Equations (PDEs) of the p2D model into a system of Differential Algebraic Equations (DAEs). The simplifications use assumptions to achieve closure, while also assuming constant electrolyte transport properties for tractability. For both types of approaches, the use of higher-order polynomial profiles for increased accuracy is expected to increase the DAE system size, with the attendant penalty for computational efficiency.

Extensions of SPM to electrolyte dynamics are often termed 'SPMe', where e denotes electrolyte. A common approach begins with the assumption of a uniform reaction in the electrodes. This results in simplified PDEs for electrolyte concentration. For constant electrolyte diffusivity, SPMe results in linear PDEs, which are computationally simple to solve. Indeed, it is possible to derive closed-form analytical solutions for the constant diffusivity case. Alternatively, instead of constant reaction distributions, polynomial spatial dependence for concentration can also be assumed, resulting in a system of DAEs. With the knowledge of electrolyte concentrations, the electrolyte current equation is usually integrated, or volume-averaged quantities are used to obtain the liquid-phase potential drop. In some cases, polynomial profiles are assumed for the liquid-phase potential as well. This information is then used in conjunction with the electrode-kinetics equation to estimate the cell voltage. The uniform-reaction SPMe is rigorously derived from the scaled p2D model in the limit of fast electrolyte diffusion dynamics. This perturbation approach yields simplified algebraic expressions for the various polarization contributions to the cell voltage. These expressions can be evaluated at negligible computational cost. In addition, the cell voltage equation is expressed in terms of electrode-averaged quantities to obviate the need for assumptions on the pore-wall flux at the terminals.

The PDE system in SPMe becomes non-linear in the case of variable diffusion coefficient, which might compromise computational efficiency. When solving numerically, the non-linearities are likely to entail finer spatial discretization in both the electrode and the solid particle to ensure numerical convergence, which will increase the DAE system size. The stiffness of the resulting system is also likely to increase for the non-linear case, especially at high current densities. The effect of increased computational cost may become more significant in real-time environments, both due to stringent accuracy requirements and hardware limitations. In addition, even in situations where the non-linear equation is solved numerically, simplifications of the electrolyte current equation, such as constant electrolyte conductivity, are necessary to allow tractable integration for calculating electrolyte ohmic drop. This can be a requirement even if polynomial profiles for electrolyte concentration are assumed for the non-linear equation. The perturbation approach results in expressions in which the transport properties are evaluated at a given representative concentration. This may result in errors in estimating concentration overpotentials at high discharge rates, where substantial spatial variations are expected to arise. Additionally, it is not clear whether the algebraic expressions for electrolyte ohmic drop are valid for variable concentration properties and may have to be rederived. Using a constant value may lead to errors in estimating ohmic drops and concentration overpotentials at high current-densities.

What is desired are techniques that can provide electrochemical battery models that can both be computed efficiently and can provide higher accuracy and performance, in order to effectively and accurately control charging and/or discharging of batteries.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a battery management system is provided. The battery management system comprises a connector for electrically coupling a battery to the battery management system, at least one sensor configured to detect a battery state, a programmable chip configured to control at least one of charging and discharging of the battery, and a controller device. The controller device is configured to receive at least one battery state from the at least one sensor; provide the at least one battery state as input to a tanks-in-series model that represents the battery; and provide at least one output of the tanks-in-series model to the programmable chip for controlling at least one of charging and discharging of the battery.

In some embodiments, a method of managing at least one of charging and discharging of a battery is provided. A controller device receives at least one battery state of the battery from at least one sensor. The controller device provides the at least one battery state as input to a tanks-in-series model that represents the battery. The controller device uses at least one output of the tanks-in-series model to control the at least one of charging and discharging of the battery.

In some embodiments, a computer-implemented method of deriving a model for controlling at least one of charging and discharging a battery is provided. A computing device integrates pseudo 2-dimensional (P2D) model representations over volumes of a cathode domain of the battery, an anode domain of the battery, and a separator domain of the battery. The computing device approximates interfacial fluxes between the domains, wherein a corresponding gradient is expressed as an average value minus an interfacial value of a dependent variable over a length scale to create a tanks-in-series representation of the battery. The computing device provides the tanks-in-series representation of the battery as the model for controlling at least one of charging and discharging of the battery.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments of the present disclosure, a Tanks-in-Series modeling approach is used to reduce the p2D model of a battery. The electrolyte conservation equations are arranged in volume-averaged form, without resorting to any direct assumptions on the spatial dependence, unlike in polynomial profile methods. The proposed Tanks-in-Series approach also does not assume uniform reaction rates to predict concentration profiles, since we deal in average quantities. The key approximations are (a) in the interfacial fluxes and (b) using the electrode-averaged pore-wall flux to estimate the electrode-averaged overpotential. For problem closure, we make reasonable approximations for the flux variables at the interface. Mass and charge conservation are imposed at the domain interfaces in order to determine the unknown interfacial values. The cell-voltage is then calculated from the known electrode-averaged pore-wall flux. This formulation allows for the inclusion of concentration-dependent transport properties, since terminal-to-terminal integration is not required, and the properties are only evaluated at the domain interfaces. In addition, it reduces the full p2D model into a fixed-size system of <20 DAEs and no PDEs need be solved.

An efficient, conservative model for lithium-ion batteries is presented, which uses a Tanks-in-Series approach to generate approximate equations for electrolyte dynamics. Despite the loss of information due to volume-averaging, the additional equations result in a nearly four-fold reduction in error compared to typical SPM at high (5C) discharge rates. While the Tank Model achieves excellent accuracy with respect to the full p2D model for the cell considered herein (<0.4% error), even better performance is expected for electrodes with inherently more uniform reaction distributions. The model formulation provides for the convenient refinement of flux approximations and estimation to increase accuracy for more aggressive parameter combinations. The model retains the computational simplicity of SPM-like models, with the ~millisecond computation time making it a candidate for a replacement of SPM in the simulation of large series-parallel configurations of cells. The model may also be used for long cycle simulation and parameter estimation towards modeling capacity degradation, and the evaluation of models for the same. The generalized methodology described herein can be applied to electrochemical models for more complex systems, including but not limited to conversion chemistries such as Li-sulfur and lead-acid batteries.

Figure 1:
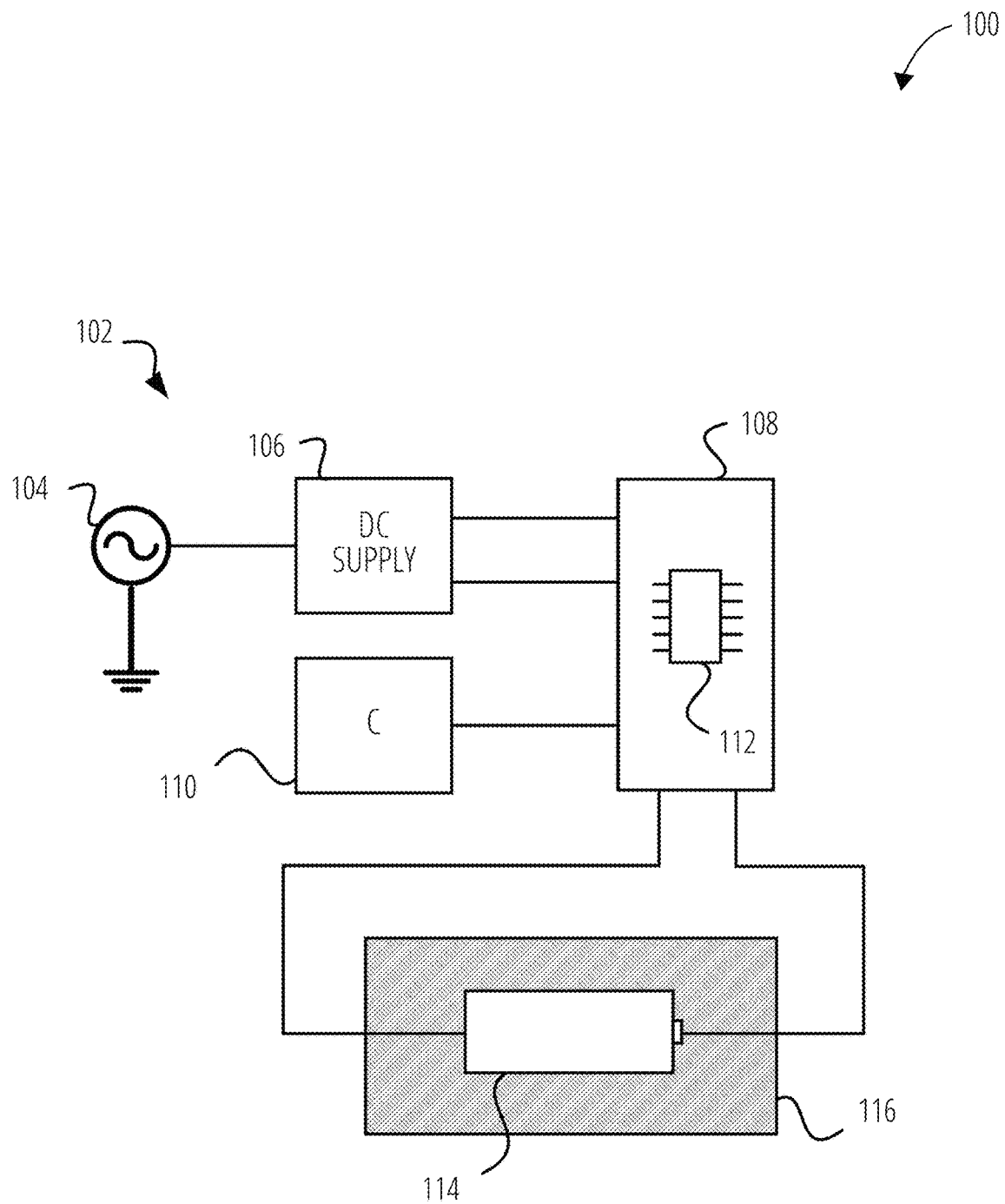
FIG. 1 is a partially schematic view of a non-limiting example embodiment of a battery management system according to various aspects of the present disclosure.

FIG. 1 is a partially schematic view of a non-limiting example embodiment of a battery management system 102 according to various aspects of the present disclosure. The battery management system 102 is a non-limiting example of a system that may use the Tanks-in-Series techniques described herein to control charging and/or discharging of a battery.

In some embodiments, the battery management system 102 may include a power supply 104 and a DC supply 106 that provides power to an electronics board 108. The electronics board 108 may include several components including a programmable chip 112 (e.g., an EPROM). A battery charging housing 116 may include at least one rechargeable battery 114. In some embodiments, the battery charging housing 116 may be replaced by connectors that are electrically connected to the electronics board 108 with conductive wires.

The operation of the DC supply 106 and/or the electronics board 108 may be controlled by a controller 110. For example, the controller 110 may load data onto the programmable chip 112 that, in turn, controls the DC supply 106. The data loaded by the controller 110 onto the programmable chip 112 may include one or more parameters for a model that describes, for example, charging/discharging, heating, cycling, etc., for the rechargeable batteries. and/or may include the model itself. For example, parameters and/or models obtained by one or more of the techniques described below may be used to control charging/ discharging current, charging/discharging voltage, temperature of the battery, peak efficiency of the battery, optimal number of charging/discharging cycles, etc., of the battery 114 through the controller 110 and/or programmable chip 112. In some embodiments, the controller 110 may control the DC supply 106 directly. In some embodiments, the controller 110 may be part of (e.g., may be carried by) the electronics board 108.

A single battery 114 is illustrated and described herein for the sake of simplicity. However, in some embodiments, the battery management system 102 may support using more than one battery 114. If more than one battery 114 is used, then there may be a separate controller 110 or programmable chip 112 associated with each battery 114, or a single controller 110 or programmable chip 112 may manage all of the batteries 114. One of ordinary skill in the art will recognize that the battery management system 102 illustrated in FIG. 1 is an example only, and will recognize that the techniques described herein may be used in other types of devices that are used to control charging and/or discharging of a battery without departing from the scope of the present disclosure.

Figure 2:
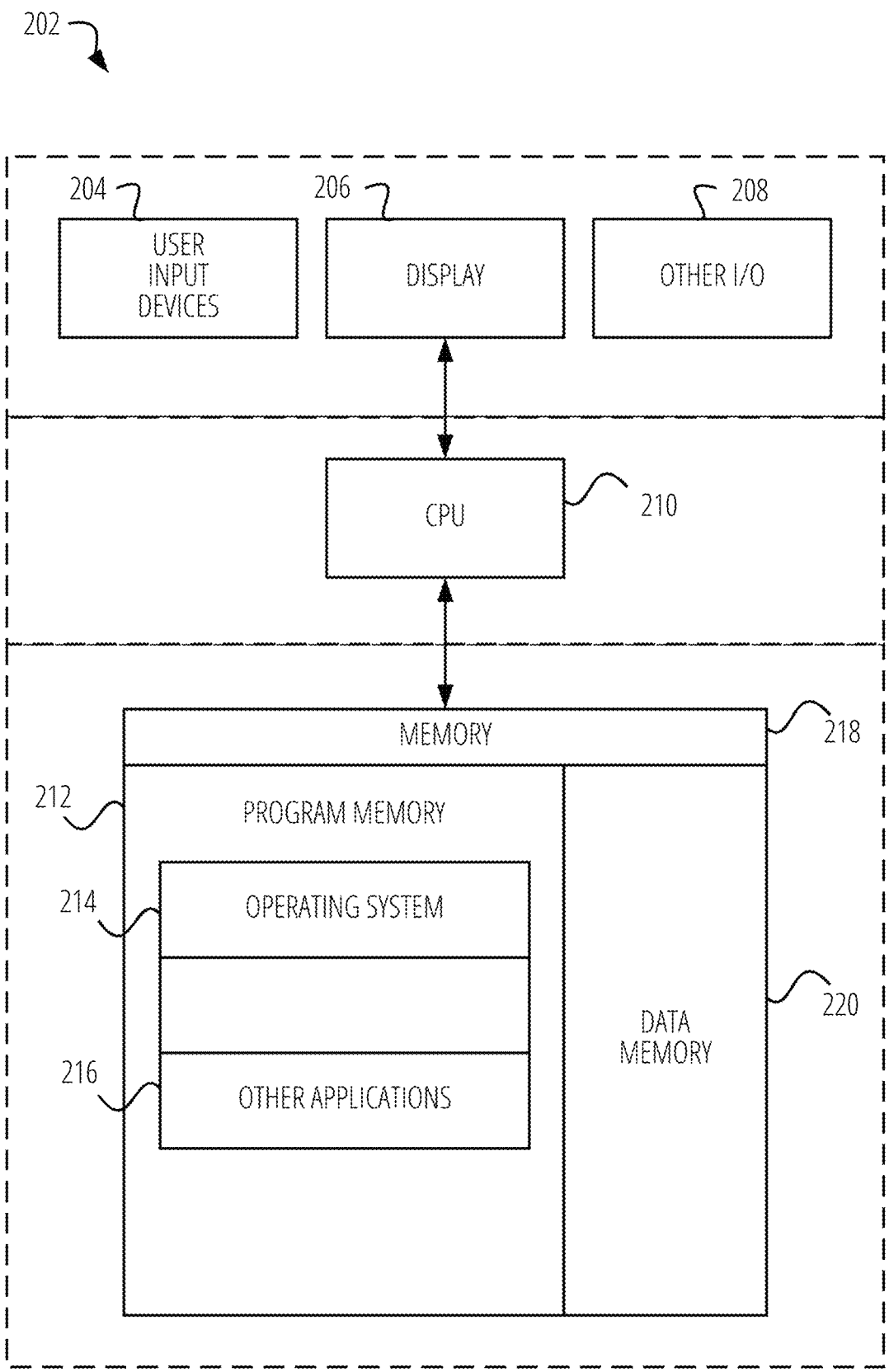
FIG. 2 is a block diagram of a non-limiting example embodiment of a controller for a battery management system according to various aspects of the present disclosure.

FIG. 2 is a block diagram of a non-limiting example embodiment of a controller 202 (e.g., a computing device) for a battery management system according to various aspects of the present disclosure. The controller 202 may be suitable for use as a controller 110 as illustrated in FIG. 1. The controller 202 includes one or more input devices 204 that provide input to a processor (CPU 210). Input devices 204 can include, for example, a mouse, a keyboard, a touchscreen, an infrared sensor, a touchpad, wearable input devices, a camera or image-based input device, microphone, or other input devices. The CPU 210 may be a single processing unit or multiple processing units in a device or distributed across multiple devices. The CPU 210 may be coupled to other hardware devices, for example, with the use of a BUS, such as a PCI BUS or SCSI BUS. Further, the CPU 210 may communicate with a hardware controller for devices such as for a display 206. The display 206, for example, may be used to display text and graphics. One example of a suitable display 206 is a touchscreen that provides graphical and textual visual feedback to a user. In some embodiments, the display 206 includes the input devices 204 as part of the display, such as when the input device is a touchscreen. In some embodiments, the display 206 is separate from the input device 204. Examples of standalone display devices include, for example, an LCD display screen, an LED display screen, a projected display (such as a heads-up display device), and so on. Other I/O devices 208 may also be coupled to the CPU 210, such as a video or audio card, USB or other external devices, printer, speakers, CD-ROM drive, DVD drive, disk drives, Blu-Ray devices, battery connection cables, or battery measurement tools. In some implementations, other I/O devices 208 also include a communication device capable of communicating wirelessly or wire-based with a network node. The communication device may communicate with another device or a server through a network using, for example, TCP/IP protocols.

The CPU 210 can access a memory 218. The memory 218 can include one or more hardware devices for volatile and non-volatile storage, and may include both read-only and writable memory. For example, the memory 218 may comprise random access memory (RAM), read-only memory (ROM), writable non-volatile memory, such as flash memory, hard drives, floppy disks, CDs, DVDs, magnetic storage devices, tape drives, device buffers, and so forth. The memory 218 can include non-transitory electrical signals on the underlying hardware. The memory 218 can include program memory 212 that contains programs and software, such as an operating system 214 and other application programs 216. The memory 218 also includes data memory 220 that includes any configuration data, settings, user options and preferences that may be needed by the program memory 212. The controller 202 may include general purpose or special purpose computing system environments or configurations. In some embodiments, the controller 202 may not include the illustrated input devices 204 or display 206, but may instead be a component that is accessible programmatically only.

Many embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on non-transitory computer-readable media, including magnetic or optically readable or removable computer disks, as well as distributed electronically over networks. Data structures and transmissions of data particular to aspects of the technology are also encompassed within the scope of the embodiments of the technology.

Figure 3A:
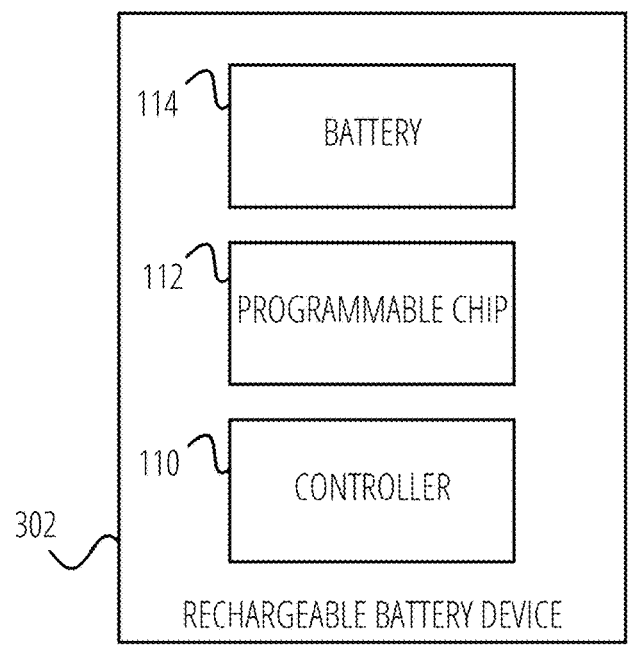
FIG. 3A and FIG. 3B are block diagrams that illustrate non-limiting example embodiments of the present disclosure as they may be deployed in devices.
Figure 3B:
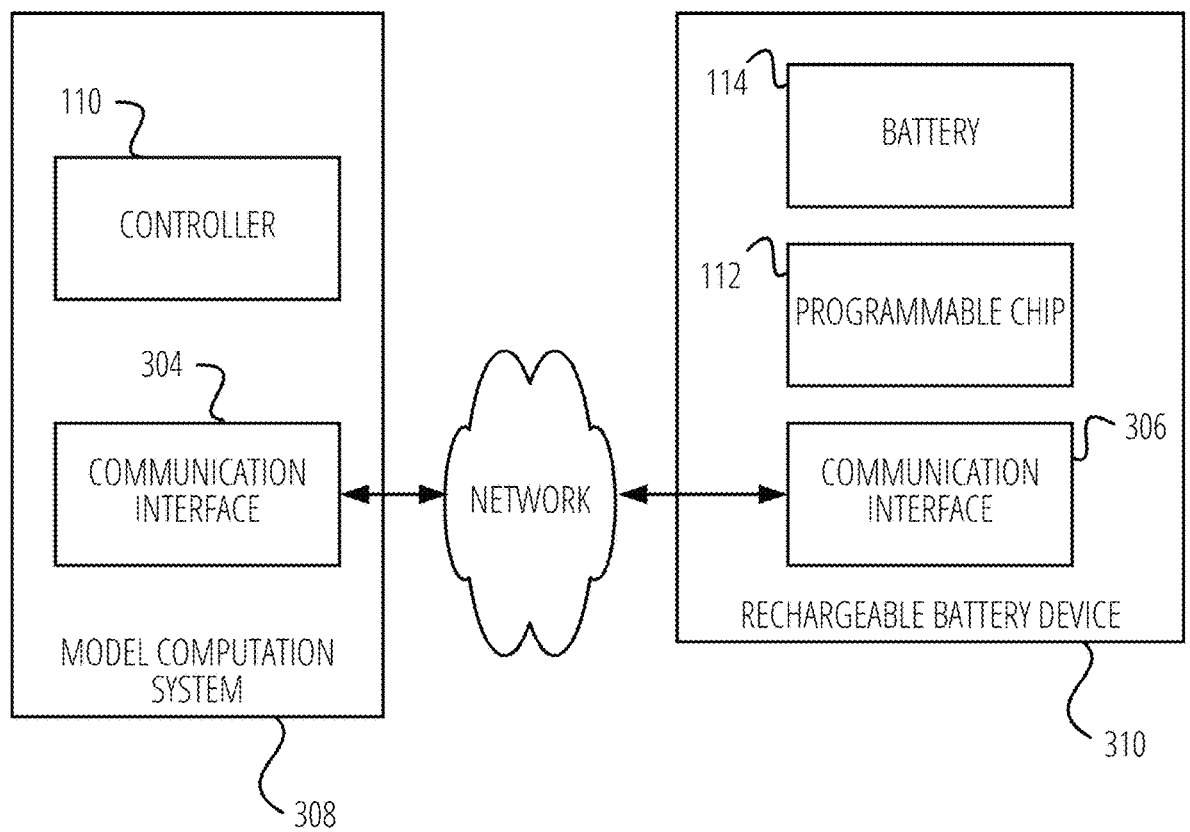

FIG. 3A and FIG. 3B are block diagrams that illustrate non-limiting example embodiments of the present disclosure as they may be deployed in devices. FIG. 3A illustrates an example of a self-contained rechargeable battery device 302. The rechargeable battery device 302 is self-contained in that the controller 110, programmable chip 112, and battery 114 are all enclosed within a single housing. Such an embodiment would include a controller 110 that has adequate computing power to determine the model for use by the programmable chip 112 in controlling the battery 114 as described fully below.

FIG. 3B illustrates an example of a rechargeable battery device 310 that is not self-contained in the same way as the rechargeable battery device 302)) illustrated in FIG. 3A. As shown, the rechargeable battery device 310 has a housing that encloses the battery 114 and the programmable chip 112, but not the controller 110. Instead, the housing of the rechargeable battery device 310 encloses a communication interface 306, which is configured to communicate with a corresponding communication interface 304 of a model computation system 308. The model computation system 308 and controller 110 may be implemented using any suitable computing device or devices, including but not limited to a laptop computing device, a desktop computing device, a cluster of computing devices, and one or more computing devices in a cloud computing service.

Communication between the communication interface 306 of the rechargeable battery device 310 and the communication interface 304 of the model computation system 308 may be by any suitable communication technique, including but not limited to wired or wireless Internet communication; wireless communication including but not limited to WiFi, 3G, 4G, LTE, or Bluetooth; and wired communication including but not limited to USB, Firewire, Ethernet, fiber optic, CAN bus, or OBD-II. In use, the rechargeable battery device 310 may measure a discharge curve for the battery 114, and may transmit the discharge curve and any other relevant information (including but not limited to temperature readings or other readings from one or more sensors) to the model computation system 308. The model computation system 308 may then use its superior computing power to have the controller 110 determine the model of the battery 114 based on the discharge curve and any other relevant information as described below. The model is then transmitted back to the rechargeable battery device 310.

Figure 4:
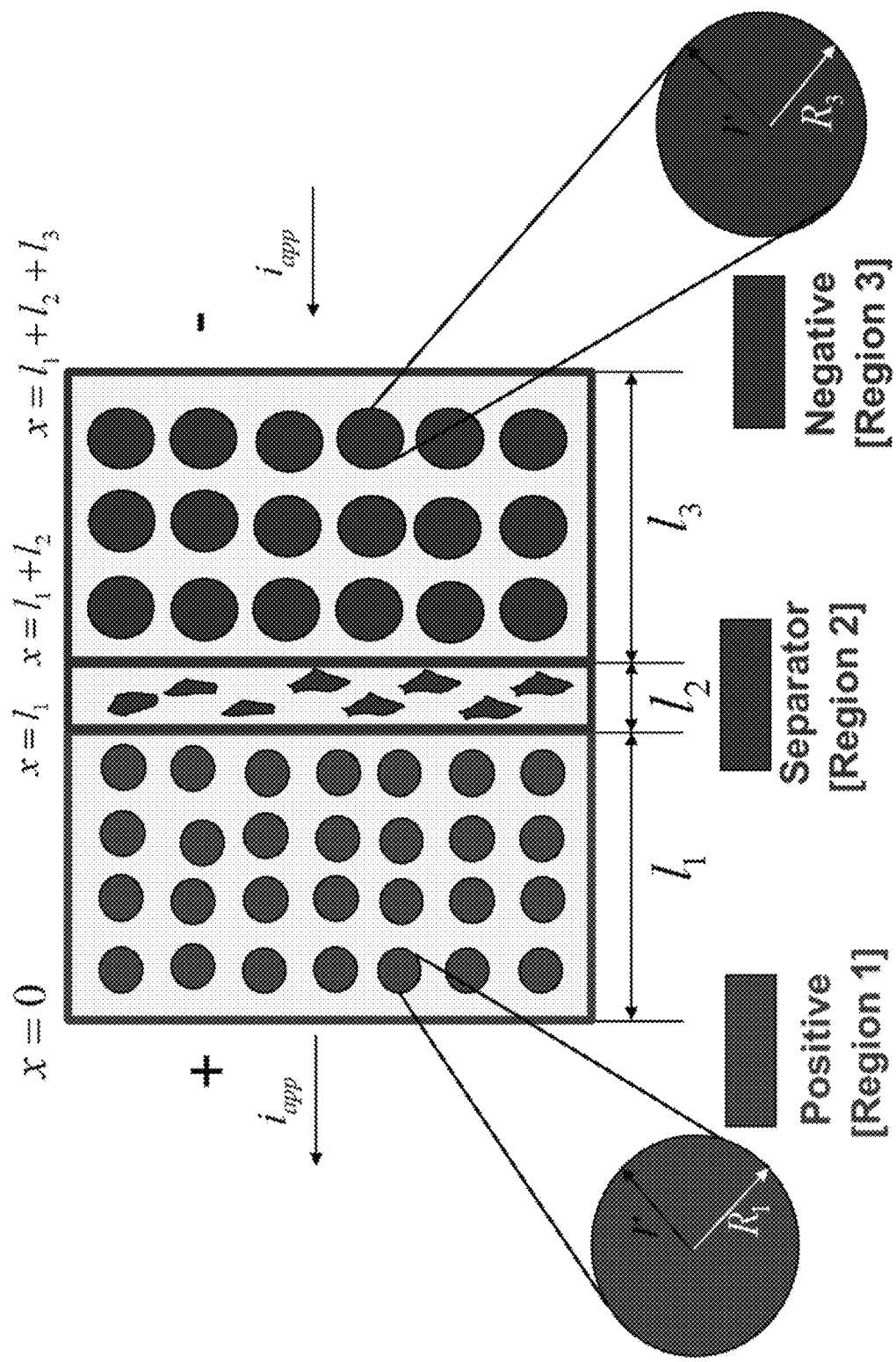
FIG. 4 illustrates the computational schematic of the pseudo 2-dimensional (p2D) model of Newman and co-workers, a continuum electrochemical model that has found substantial application for simulation of Li-ion battery performance.

FIG. 4 illustrates the computational schematic of the pseudo 2-dimensional (p2D) model of Newman and co-workers, a continuum electrochemical model that has found substantial application for simulation of Li-ion battery performance. The active material in both electrodes is modeled as spherical particles. Electron-transfer reactions are modeled at the particle-electrolyte interface, as is the transport of intercalated lithium through the active particle. Liquid phase mass and charge transport through the thickness of each domain also modeled using concentrated solution theory. Electron transport through the solid phase is also considered, with electronic current entering and leaving the cell at the current collectors (not shown).

The typical p2D model is written for a single 'cathode-separator-anode' sandwich. Each domain is modeled using porous electrode theory, in which the two solid and electrolyte phases are regarded as superimposed continua. The model is a set of coupled partial differential equations (PDEs) based on one-dimensional conservation laws for charge and mass in each domain. The individual domain equations are coupled through the specification of appropriate interfacial boundary conditions, which also ensure mathematical well-posedness. In the p2D representation of the battery, the active material is regarded as composed of spherical particles of uniform radii. Lithium intercalation and de-intercalation occurs through electron-transfer reactions at the particle surface and transport through the solid particle, modeled by conservation laws in the 'pseudo' r-dimension. The complete mathematical model and parameter values may be found in Table I-Table III below.

In the absence of complexities such as phase-separation or concentrated solution effects, solid phase transport is modeled by Fick's second law in spherical coordinates. For the positive electrode particle, we have $$\frac{\partial c_1^s}{\partial t} = \frac{1}{r^2}\frac{\partial}{\partial r}\left(r^2 D_1^s \frac{\partial c_1^s}{\partial r}\right) \quad [0 < x < l_1] \tag{1}$$

Where the r coordinate denotes the radial distance within the particle and is thus the second 'pseudo-dimension'. The subscript 1 denotes variables and parameters pertinent to the positive electrode (region 1).

In porous electrode theory, equation (1) is valid at each point along the electrode thickness x. The superscript s is used to denote the solid phase. $D_1^s$ is the diffusion coefficient in the positive particle. The second-order problem in r requires the specification of two boundary conditions. At the surface of the solid particle, the diffusive flux is related to the local rate of electrode reaction or pore-wall flux as $$-D_1^s \frac{\partial c_1^s}{\partial r} = j_1 \quad [r = R_1, 0 < x < l_1] \quad (2)$$

A symmetry boundary condition is applied at the center of the positive particle $$\frac{\partial c_1^s}{\partial r} = 0 \quad [r = 0, 0 < x < l_1] \quad (3)$$

The analogous set of equations are written for the negative electrode (region 3)

$$\frac{\partial c_3^s}{\partial t} = \frac{1}{r^2} \frac{\partial}{\partial r}\left(r^2 D_3^s \frac{\partial c_3^s}{\partial r}\right) \quad [l_1 + l_2 < x < l_1 + l_2 + l_3] \quad (4)$$

With the boundary conditions given by $$-D_3^s \frac{\partial c_3^s}{\partial r} = j_3 \quad [r = R_3, l_2 + l_3 < x < l_1 + l_2 + l_3] \quad (5)$$

$$\frac{\partial c_3^s}{\partial r} = 0 \quad [r = 0, l_1 + l_2 < x < l_1 + l_2 + l_3] \quad (6)$$

The Butler-Volmer equation is a common constitutive relation for the pore-wall flux in each electrode as follows $$j_1 = k_1 c_1^{\alpha_{a,1}} (c_1^{s,max} - c_1^{s,surf})^{\alpha_{a,1}} (c_1^{s,surf})^{\alpha_{c,1}} \left(\exp\left(\frac{\alpha_{a,1} F \eta_1}{RT}\right) - \exp\left(\frac{-\alpha_{c,1} F \eta_1}{RT}\right)\right) \quad (7)$$

Where $k_1$ is the rate constant for the positive electrode reaction, and $c_1^{s,max}$ denotes the maximum concentration of Li in the positive electrode particle. F and R denote Faraday's constant and the gas constant respectively. $\alpha$'s are the charge transfer coefficients for each electrode reaction. The quantity $\eta = \phi_{s,1} - \phi_{l,1} - U_1(c_1^{s,surf})$ is the surface overpotential, expressed as the difference between the solid and liquid phase potentials minus the electrode open circuit potential $U_1(c_1^{s,surf})$ vs. a Li/Li$^+$ reference electrode. $c_1^{s,surf}$ is the solid particle concentration evaluated at the surface of the particle, i.e.

$$c_1^{s,surf} = c_1^s(r = R_1, x, t) \quad (8)$$

The dependence of open circuit potential (OCP) on the surface concentration is indicated accordingly. The equivalent expression for the negative electrode is given by $$j_3 = k_3 c_3^{\alpha_{a,3}} (c_3^{s,max} - c_3^{s,surf})^{\alpha_{a,3}} (c_3^{s,surf})^{\alpha_{c,3}} \left(\exp\left(\frac{\alpha_{a,3} F \eta_3}{RT}\right) - \exp\left(\frac{-\alpha_{c,3} F \eta_3}{RT}\right)\right) \quad (9)$$

Equations (1) and (4) can be volume-averaged over their respective electrode volumes. For the positive electrode, we obtain $$\frac{\partial \int_{x=0}^{x=l_1} c_1^s dx}{\partial t} = \frac{1}{r^2} \frac{\partial}{\partial r}\left(r^2 D_1^s \frac{\partial \int_{x=0}^{x=l_1} c_1^s dx}{\partial r}\right) \quad (10)$$

The volume-averaged form becomes $$\frac{\partial \overline{c_1^s}}{\partial t} = \frac{1}{r^2} \frac{\partial}{\partial r}\left(r^2 D_1^s \frac{\partial \overline{c_1^s}}{\partial r}\right) \quad (11)$$

Similarly, for the negative electrode, we have $$\frac{\partial \overline{c_3^s}}{\partial t} = \frac{1}{r^2} \frac{\partial}{\partial r}\left(r^2 D_3^s \frac{\partial \overline{c_3^s}}{\partial r}\right) \quad (12)$$

The corresponding boundary conditions can also be expressed in volume-averaged form.

$$\frac{\partial \overline{c_i^s}}{\partial r} = -\frac{\overline{j_i}}{D_i^s}, r = R_i \quad i \in \{1, 3\} \quad (13)$$

$$\frac{\partial \overline{c_i^s}}{\partial r} = 0, r = 0$$

Numerical solution of these equations entails spatial discretization in the spherical dimension. Discretization of equations (11) and (12) results in a system of Differential Algebraic Equations (DAEs), with a convenient linear form for constant $D_i^s$. For discretization, we employ an efficient three-parameter model based on a biquadratic profile for the radial dependence of $c_i^s$. This approximation is expected to ensure higher accuracy than a two-parameter parabolic profile even at relatively high rates of discharge. The discretized system of equations is therefore $$\frac{d \overline{c_i^{s,avg}}}{dt} = -3 \frac{\overline{j_i}}{R_i} \quad (14)$$

$$\frac{d \overline{q_i^{avg}}}{dt} = -30 \frac{D_i^s}{R_i^2} \overline{q_i^{avg}} - \frac{45}{2} \frac{\overline{j_i}}{R_i^2} \quad (15)$$

$$35 \frac{D_i^s}{R_i} \left[\overline{c_i^{s,surf}} - \overline{c_i^{s,avg}}\right] - 8 D_i^s \overline{q_i^{avg}} = -\overline{j_i} \quad i \in \{1, 3\} \quad (16)$$

Where the three-parameter model has been expressed in terms of the particle-averaged solid phase concentration $\overline{c_i^{s,avg}}$, the particle-averaged concentration gradient $\overline{q_i^{avg}}$, and the particle surface concentration $\overline{c_i^{s,surf}}$. The particle average concentrations are related to the State of Charge (SoC) at the cell level and is directly obtained from the simulation results in the above formulation.

As mentioned above, this disclosure provides efficient equations for the electrolyte phase, and therefore the most commonly adopted solid-phase approximation is used herein. Importantly, the accuracy of the quartic profile approximation was quantitatively verified against nearly error-free numerical methods (collocation, finite difference) for the cases considered herein.

For charge transport in the solid phase, the governing equation may be written as a conservation law for charge as follows:

$$-\frac{\partial i_{s,1}}{\partial x} - a_1 F j_1 = 0 \quad [0 < x < l_1] \tag{17}$$

The time-derivative for charge density is ignored due to electroneutrality.

Similarly, we have, for the negative electrode $$-\frac{\partial i_{s,3}}{\partial x} - a_3 F j_3 = 0 [l_1 + l_2 < x < l_1 + l_2 + l_3] \tag{18}$$

Here, are $i_{s,1}$ and $i_{s,3}$ denote the solid phase current densities. The constitutive equation for the solid phase current density is an Ohm's law expression based on the effective electronic conductivity and local potential gradient as follows $$i_{s,1} = -\sigma_1 (1 - \varepsilon_1 - \varepsilon_{f,1}) \frac{\partial \phi_{s,1}}{\partial x} \tag{19}$$

$$i_{s,3} = -\sigma_3 (1 - \varepsilon_3 - \varepsilon_{f,3}) \frac{\partial \phi_{s,3}}{\partial x}$$

Where $1 - \varepsilon_i - \varepsilon_{f,i}$ is the fraction of solid phase in electrode i, after subtracting the liquid and inert volume fractions. This factor corrects for the actual conduction pathways in the electrode material. More detailed correction factors may also be applied. The solid phase volume fraction also appears in the specific interfacial area, which for perfectly spherical particles is given by $$a_i = \frac{3}{R_i}(1 - \varepsilon_i - \varepsilon_{fi}).$$

Volume-averaging gives us $$\frac{i_{1,x=0} - i_{1,x=l_1}}{l_1} = a_1 F \overline{j_1} \tag{20}$$

Using the boundary conditions that impose the solid phase current density at the interfaces, one can simplify equation (20) as $$\frac{i_{app}}{l_1} = a_1 F \overline{j_1} \tag{21}$$

Volume averaging thus connects the applied cell current density $i_{app}$ and average pore-wall flux. The sign convention for the model is so adopted that $i_{app}$ is negative during discharge.

$$\overline{j_1} = \frac{i_{app}}{a_1 F l_1} \tag{22}$$

Similarly, for the negative electrode, we have $$\overline{j_3} = -\frac{i_{app}}{a_3 F l_3} \tag{23}$$

Equations (21) and (22) can be used in conjunction with the volume—averaged forms of equations (1)-(6) to determine the temporal evolution of average solid-phase concentrations for a given $i_{app}$. In effect, the active material in each electrode is now modeled by a single representative particle, the Li concentration profiles through which will be influenced by factors such as the applied current density $i_{app}$, solid phase diffusion coefficients $D_i^s$ and the characteristic particle radius $R_i$. This set of equations also determines the evolution of the averaged surface particle concentration, which in turn affects the surface overpotentials and thus the cell voltage response through constitutive equations (7) and (9). These equations are volume-averaged in order to obtain a relationship between the average pore-wall fluxes $\overline{j_i}$ and the average potentials $\overline{\phi_{s,i}}$ and $\overline{\phi_{e,i}}$. This is illustrated for the positive electrode in equation (24) below $$\overline{j_1} = \frac{\int_{x=0}^{x=l_1} j_1 dx}{\int_{x=0}^{x=l_1} dx} = \tag{24}$$

$$\frac{\int_{x=0}^{x=l_1} k_1 c_1^{\alpha_{a,1}} (c_{1,max}^s - c_1^{s,surf})^{\alpha_{a,1}} (c_1^{s,surf})^{\alpha_{c,1}} \left( \exp\left(\frac{\alpha_{a,1} F \eta_1}{RT}\right) - \exp\left(\frac{-\alpha_{c,1} F \eta_1}{RT}\right) \right) dx}{\int_{x=0}^{x=l_1} dx}$$

Unlike the equations for electrolyte concentration, the highly non-linear nature of the constitutive equation renders evaluation of equation (24) cumbersome and likely impossible without the use of a full-order solution that gives the actual spatial dependence of the variables. To this end, averages of non-linear quantities are approximated by their value at the average values of the variables on which they depend (i.e. $\overline{f(X)} \approx f(\overline{X})$).

Mathematically, this can be stated as $$\overline{j_i} \square \tag{25}$$

$$k_i(\overline{c_i})^{\alpha_{a,i}} \left(c_i^{s,max} - \overline{c_i^{s,surf}}\right)^{\alpha_{a,i}} \left(\overline{c_i^{s,surf}}\right)^{\alpha_{c,i}} \left( \exp\left(\frac{\alpha_{a,i} F \overline{\eta_i}}{RT}\right) - \exp\left(\frac{-\alpha_{c,i} F \overline{\eta_i}}{RT}\right) \right)$$

$$\overline{\eta_i} = \overline{\phi_{1,i}} - \overline{\phi_{2,i}} - U_i(\overline{c_i^{s,surf}}) \; i \in \{1, 3\}$$

The classic Single Particle Model (SPM) employs an additional simplification by ignoring the dynamics of the electrolyte phase. Therefore, $\overline{c_i} = c_0$, implying that the electrolyte concentration is always equal to its initial value. Neglecting liquid phase variations also means that $\overline{\phi_{2,i}}$ is often set to a constant reference, .e.g. $\overline{\phi_{2,i}} = 0$ for all i.

Neglect of ohmic and electrolyte concentration effects restricts the accuracy of SPM to operating regimes characterized by low ohmic losses, low currents, and kinetically limited electrodes, which usually result in spatially uniform pore-wall flux distributions. To this end, the Tanks-in-Series descriptions of electrolyte dynamics are expected to augment and improve the practical applicability of SPM.

Figure 5:
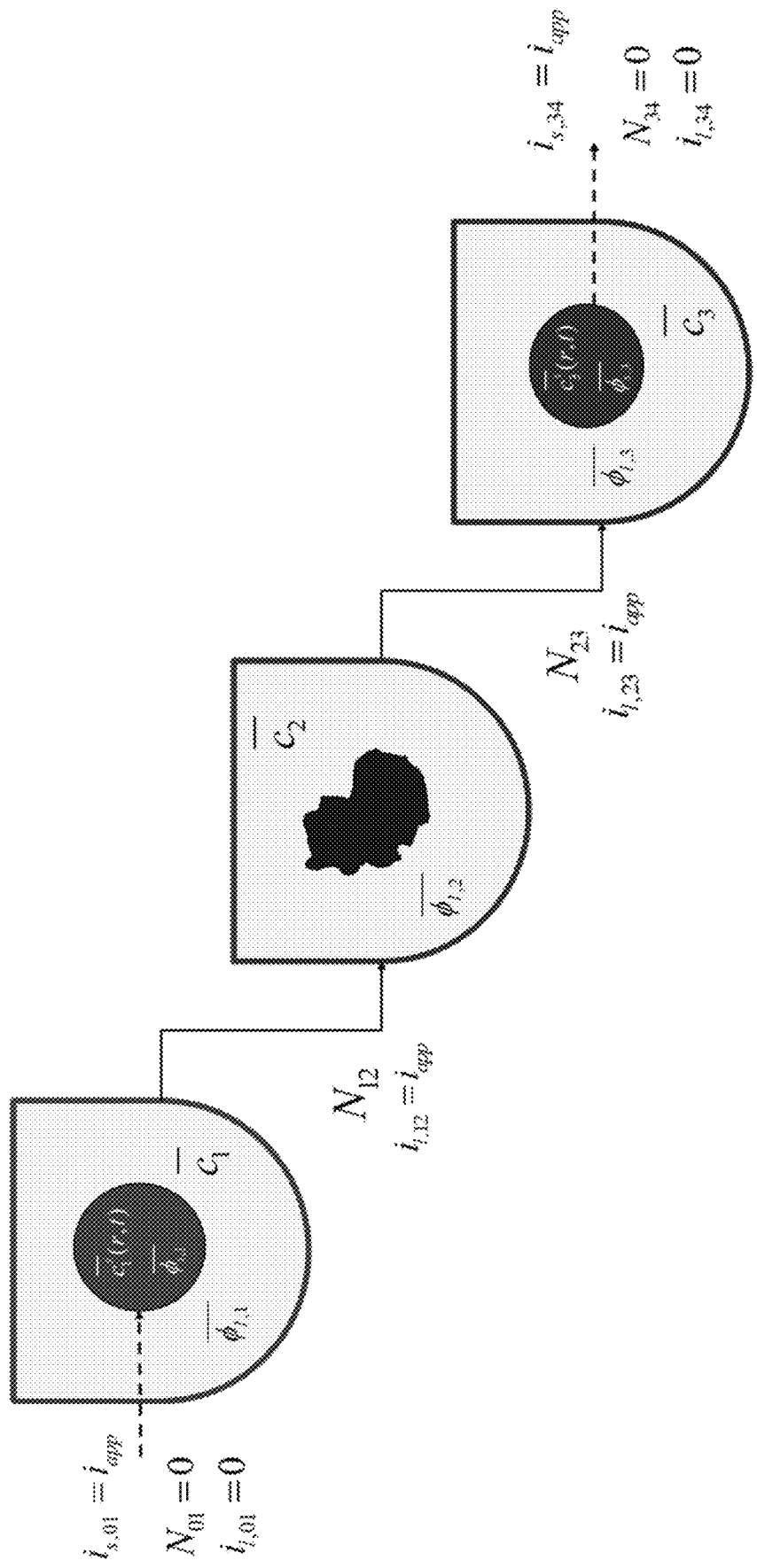
FIG. 5 illustrates a visualization of a non-limiting example embodiment of the Tank Model approach depicting the mass and charge flows in to and out of each 'tank' according to various aspects of the present disclosure.

FIG. 5 illustrates a visualization of a non-limiting example embodiment of the Tank Model approach depicting the mass and charge flows in to and out of each 'tank' according to various aspects of the present disclosure. Since both the electrolyte flux and liquid phase current density are zero at the current collectors, net flows into the liquid phase of the positive 'tank' and out of the negative 'tank' are zero. The interfacial boundary conditions at the separator define the mass and charge flows for the middle separator 'tank'. The electronic current carried by the solid phase at the current collectors is denoted by dotted lines. The solid and liquid phases exchange mass and charge at a rate determined by the pore-wall flux $\bar{j}_i$, an internal exchange which is not shown here. The sign convention is so adopted that $i_{app}$ is negative during discharge.

In deriving the Tanks-in-Series model, the volume-averaging procedure is applied first to the solid phase conservation equations, illustrating how SPM is recovered under certain assumptions. The concept is then applied to the electrolyte transport equations, thereby resulting in averaged equations for the liquid phase 'Tanks' of FIG. 5.

Figure 6:
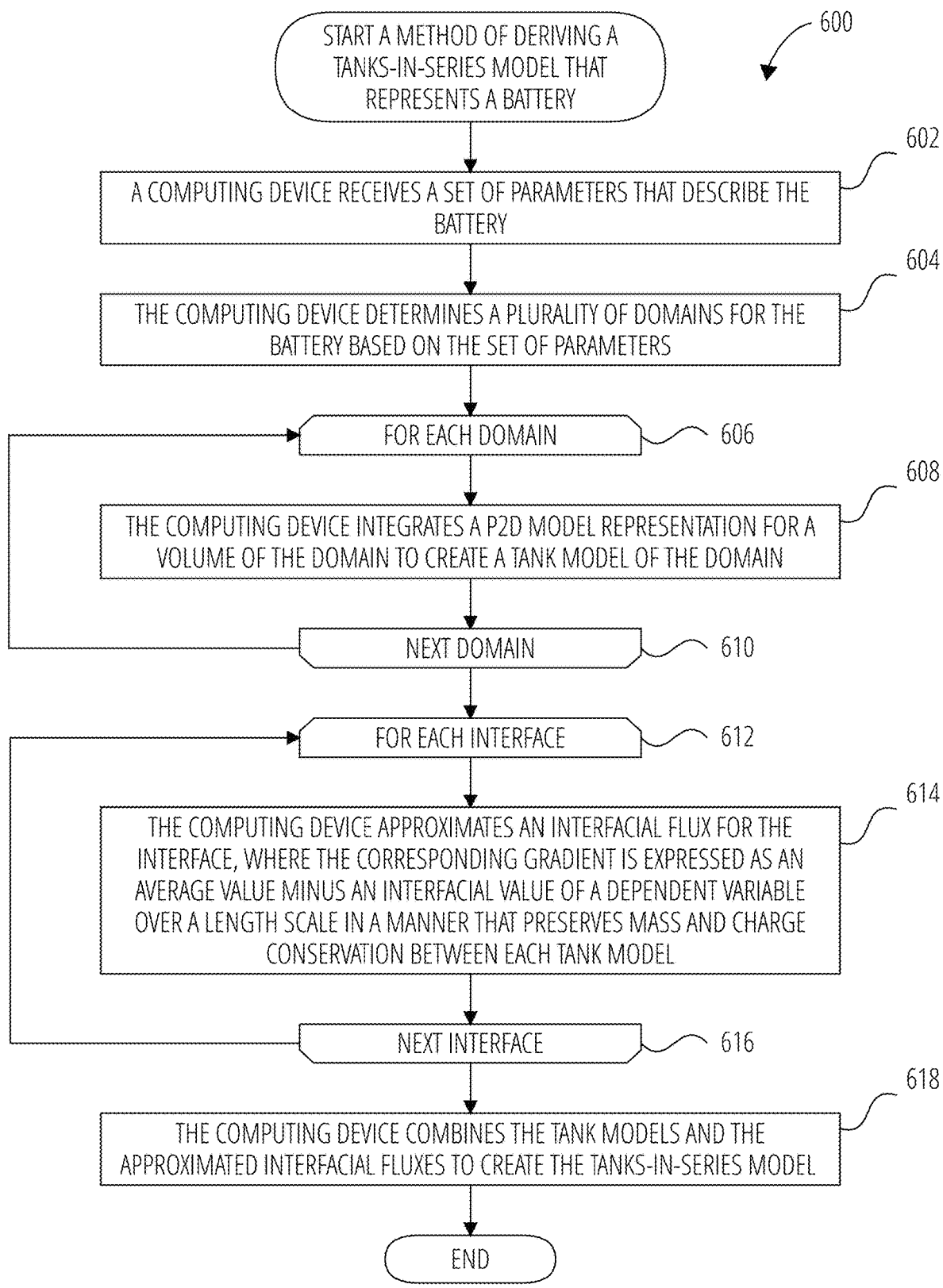
FIG. 6 is a flowchart that illustrates a non-limiting example embodiment of a method of deriving a tanks-in-series model that represents a battery according to various aspects of the present disclosure.

FIG. 6 is a flowchart that illustrates a non-limiting example embodiment of a method of deriving a tanks-in-series model that represents a battery according to various aspects of the present disclosure. The method 600 is a high-level description of the general steps performed in deriving the tanks-in-series model. A rigorous description of the specific steps and computations involved is provided after the discussion of the general flowchart. Any suitable computing device may be used to conduct the method 600, including but not limited to the controller 110 described above.

From a start block, the method 600 proceeds to block 602, where a computing device receives a set of parameters that describe the battery 114. The parameters of the set of parameters describe physical elements that make up the battery 114, and may include one or more of a porosity, an electrode filler fraction, a Bruggeman tortuosity correction, a particle surface area per unit volume, a maximum particle phase concentration, an initial particle phase concentration an initial electrolyte concentration, a solid phase diffusivity, an electrode reaction rate constant, an electrode reaction anodic coefficient, an electrode reaction cathodic coefficient, an electrode thickness, a characteristic particle radius, a Li+ transference number, an electronic conductivity, a temperature, and a current density (1C).

At block 604, the computing device determines a plurality of domains for the battery 114 based on the set of parameters. In some embodiments, different parameters may be provided for each domain (e.g., an anode domain, a cathode domain, and a separator domain) of the battery 114, and so the computing device may determine the plurality of domains by reviewing the domains for which parameters were provided. Typically, three domains (an anode domain, a cathode domain, and a separator domain) are provided for a given battery 114, but this should not be seen as limiting. In some embodiments wherein multiple cells are stacked to form a single battery 114, domains may be provided for each cell.

The method 600 then proceeds to a for-loop defined between a for-loop start block 606 and a for-loop end block 610 that is executed for each domain that was determined at block 604. From the for-loop start block 606, the method 600 advances to block 608, where the computing device integrates a pseudo-two dimensional (p2D) model representation for a volume of the domain to create a tank model of the domain. This integration simplifies the calculation that would otherwise be used to solve the p2D model, thus improving the speed of the calculation and enabling the calculation to be performed on less-capable computing hardware. A detailed description of this integration is provided below.

The method 600 then advances to the for-loop end block 610. If further domains remain to be processed, then the method 600 returns to for-loop start block 606 to process the next domain. Otherwise, if all of the domains have been processed, then the method 600 advances to a for-loop defined between a for-loop start block 612 and a for-loop end block 616 that is executed for each interface between domains determined at block 604. Typically, an interface will be determined between the anode domain and the separator domain, and another interface will be determined between the separator domain and the cathode domain, though other arrangements could be possible. From the for-loop start block 612, the method 600 advances to block 614, where the computing device approximates an interfacial flux for the interface, where the corresponding gradient is expressed as an average value minus an interfacial value of a dependent variable over a length scale in a manner that preserves mass and charge conservation between each tank model. A detailed description of the calculation and use of the interfacial flux values is provided below.

The method 600 then advances to the for-loop end block 616. If further interfaces remain to be processed, then the method 600 returns to for-loop start block 612 to process the next interface. Otherwise, if all of the interfaces have been processed, then the method 600 advances to block 618.

At block 618, the computing device combines the tank models and the approximated interfacial fluxes to create the tanks-in-series model. Because mass and charge have been conserved between each tank model, the tanks-in-series model has a high degree of accuracy because concentration-dependent transport properties may be considered. Further, this combination reduces the full p2D model into a fixed size system without partial differential equations, thus allowing for greatly increased speed and greatly reduced processing requirements. A detailed description of the combination of the tank models and the approximated interfacial fluxes is provided below.

The method 600 then proceeds to an end block and terminates.

Figure 7:
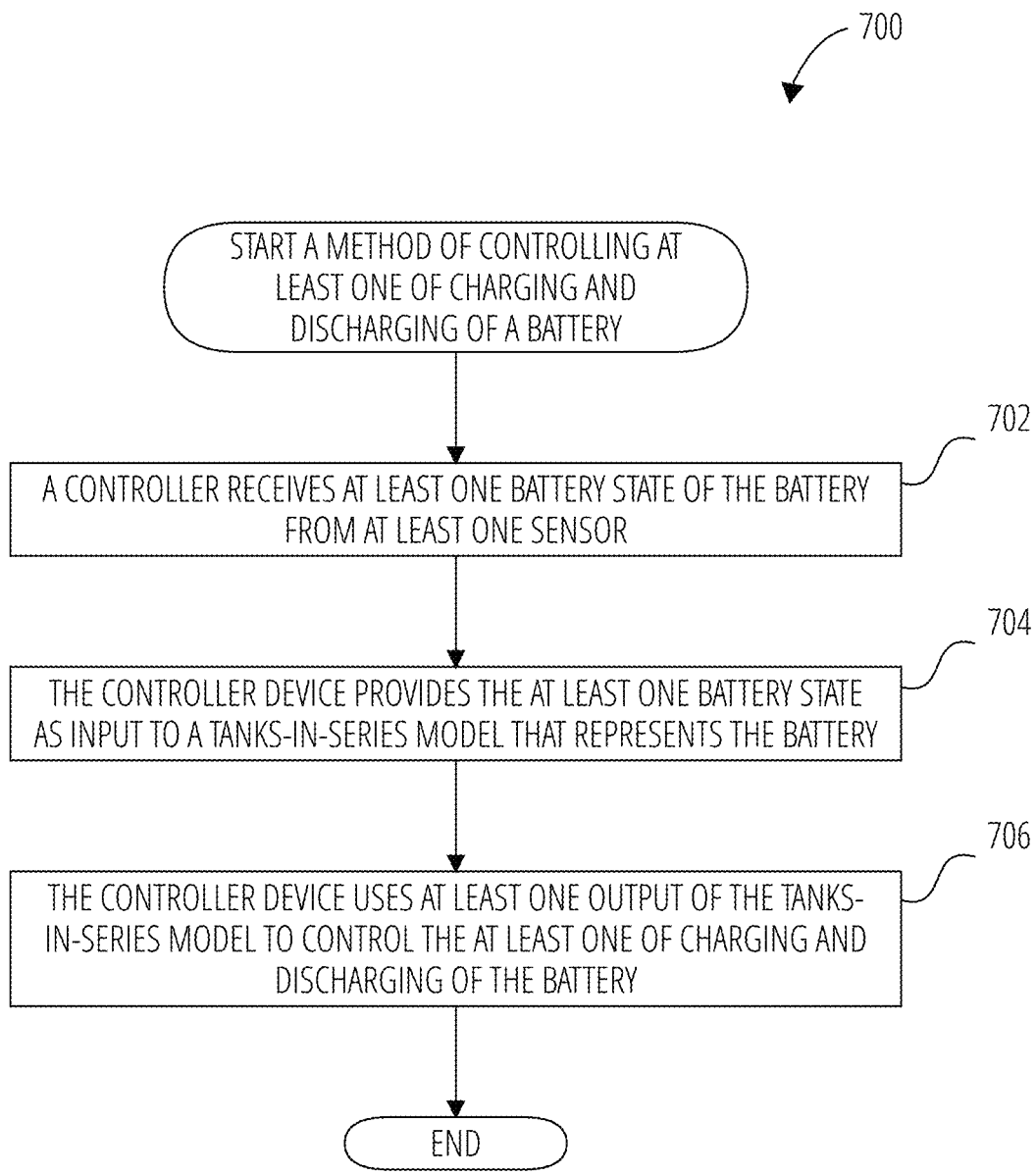
FIG. 7 is a flowchart that illustrates a non-limiting example embodiment of a method of controlling at least one of charging and discharging of a battery according to various aspects of the present disclosure.

The tanks-in-series model computed in the method 600 may be stored in a computer-readable medium, or may be transmitted by the computing device to another computing device for use in controlling charging and/or discharging of a battery 114. In some embodiments, the tanks-in-series model may be provided to a controller 110 or a programmable chip 112 in order to control the charging and/or discharging of a battery 114. FIG. 7 is a flowchart that illustrates a non-limiting example embodiment of a method of controlling at least one of charging and discharging of a battery according to various aspects of the present disclosure. In the method 700 as illustrated and described, it is assumed that the controller 110 has access to the tanks-in-series model computed by the method 600. In some embodiments, instead of the controller 110, the method 700 may be performed by the programmable chip 112 after the tanks-in-series model is provided to it by the controller 110.

From a start block, the method 700 proceeds to block 702, where a controller 110 receives at least one battery state of the battery 114 from at least one sensor. The at least one battery state may be any battery state the tanks-in-series model is designed to accept as input. For example, the at least one battery state may include a terminal voltage of the battery 114 or a surface temperature of the battery 114 sensed by an appropriate sensor device operatively coupled to the battery 114.

At block 704, the controller 110 provides the at least one battery state as input to a tanks-in-series model that represents the battery 114. The tanks-in-series model uses the at least one battery state to determine a state-of-charge, a state of health, or some other value that can be used to control charging and/or discharging of the battery 114. At block 706, the controller 110 uses at least one output of the tanks-in-series model to control the at least one of charging and discharging of the battery 114.

The method 700 then proceeds to an end block and terminates.

As discussed above, a complete description of how to derive the tanks-in-series model follows.

We begin with the governing equation for electrolyte concentration for an isothermal model in one spatial dimension. The equations for c based on porous electrode theory may be expressed in the form of conservation laws In the positive electrode, $$\varepsilon_1 \frac{\partial c_1}{\partial t} = -\frac{\partial N_1}{\partial x} + a_1(1 - t_+^0)j_1 [0 < x < l_1] \quad (26)$$

Due to the absence of solid active material, the conservation equation for c in the separator is characterized by a lack of a source term as $$\varepsilon_2 \frac{\partial c_2}{\partial t} = -\frac{\partial N_2}{\partial x} [l_1 < x < l_1 + l_2] \quad (27)$$

The subscript 2 is used to denote the variables in the separator domain.

The equation for the negative electrode is identical in form to that of the positive electrode $$\varepsilon_3 \frac{\partial c_3}{\partial t} = -\frac{\partial N_3}{\partial x} + a_3(1 - t_+^0)j_3 [l_1 + l_2 < x < l_1 + l_2 + l_3] \quad (28)$$

$N_1$, $N_2$, $N_3$ may regarded as electrolyte fluxes, which need to be related to local concentration gradients. Noting the similarity of the governing equations to Fick's second law, we have the following constitutive equations $$N_1 = -D(c_1)\varepsilon_1^{b_1} \frac{\partial c_1}{\partial x} \quad (29)$$

$$N_2 = -D(c_2)\varepsilon_2^{b_2} \frac{\partial c_2}{\partial x}$$

$$N_3 = -D(c_3)\varepsilon_3^{b_3} \frac{\partial c_3}{\partial x}$$

In the above equations, D(c) denotes the concentration-dependent electrolyte diffusion coefficient, corrected by a Bruggeman-type factor to account for porous medium tortuosity.

The governing equations for electrolyte concentration are second-order in space, which entails the specification of two boundary conditions for $c_1$, $c_2$ and $c_3$. The boundary conditions are defined at the extremities of each domain. The positive and negative current collectors are physical barriers to the transport of $Li^+$ ions, and thus the electrolyte flux at these locations is set to zero. These boundary conditions are thus given by $$N_{1,x=0} = N_{01} = 0 \quad (30)$$

And, $$N_{3,x=l_p+l_s+l_n} = N_{34} = 0 \quad (31)$$

In addition, electrolyte concentrations and their fluxes must be continuous at the interface between the separator and electrodes. At the positive electrode-separator interface, this is expressed as $$c_{1,x=l_1} = c_{2,x=l_1}$$

$$N_{1,x=l_1} = N_{2,x=l_1} = N_{12} \quad (32)$$

In general $N_{ij}$ is used to denote the flux at the interface of regions i and j.

Similarly, at the interface between the separator and negative electrode, we have $$c_{2,x=l_1+l_2} = c_{3,x=l_1+l_2}$$

$$N_{2,x=l_1+l_2} = N_{3,x=l_1+l_2} = N_{23} \quad (33)$$

Now, equation (26) is integrated over the volume of the positive electrode $V_1$ as $$\frac{\partial \int_{V_1} \varepsilon_1 c_1 dV}{\partial t} = -\int_{V_1} \frac{\partial N_1}{\partial x} dV + \int_{V_1} a_1(1 - t_+^0)j_1 dV \quad (34)$$

For the one-dimensional model in cartesian coordinates, the differential volume dV is given by dV=Adx, where A is a constant that may be considered a cross-sectional area. In addition, we express the integrals in terms of average quantities as $$\overline{c_1} = \frac{\int_{V_1} c_1 dV}{\int_{V_1} dV}, \text{ and}$$

$$\overline{j_1} = \frac{\int_{V_1} j_1 dV}{\int_{V_1} dV},$$

with $\overline{v}$ denoting the volume average of variable v in a given 'tank'. Substituting these relations converts the volume integral into a one-dimensional integral over electrode thickness, i.e. from x=0 to x=$l_1$.

Equation (34) thus becomes $$\varepsilon_1 \frac{d\overline{c_1}}{dt} = \quad (35)$$

$$-\frac{\int_{x=0}^{x=l_1} \frac{\partial N_1}{\partial x} dx}{l_1} + a_1(1 - t_+^0)\overline{j_1} = \frac{N_{1,x=0} - N_{1,x=l_1}}{l_1} + a_1(1 - t_+^0)\overline{j_1}$$

Here, we make the reasonable assumption that the electrode porosity $\varepsilon_1$, specific interfacial area $a_1$ and Li$^+$ transport number $t_+^0$ in the electrolyte phase are constant in both space and time.

Using equation (30), equation (35) reduces to $$\varepsilon_1 \frac{d\overline{c_1}}{dt} = \frac{-N_{1,x=l_1}}{l_1} + a_1(1-t_+^0)\overline{j_1} \quad (36)$$

The same sequence of operations gives us the volume-averaged equations for the separator and negative electrode as follows $$\varepsilon_2 \frac{d\overline{c_2}}{dt} = \frac{N_{2,x=l_1} - N_{2,x=l_1+l_2}}{l_2} \quad (37)$$

$$\varepsilon_3 \frac{d\overline{c_3}}{dt} = \frac{N_{3,x=l_1+l_2}}{l_3} + a_3(1-t_+^0)\overline{j_3} \quad (38)$$

It is worth noting that the steps applied so far represent a rigorous volume-averaging of the equations in each porous domain, followed by the use of the boundary conditions to eliminate interfacial flux terms where possible. No approximations have been made up to this point.

In order to track the average concentrations in each 'tank', we begin with the volume-averaged concentration equations (36)-(38). Inspection of these equations reveals the presence of the unknown interfacial flux terms that require suitable approximations to achieve closure. In doing so, we can exploit the flux boundary conditions (32) and (33), which establish the mass flow coupling between adjacent tanks in series.

A simple approximation for the interfacial diffusive flux is in terms of a 'driving force' $\Delta c$ and a 'length scale' approximation $\delta_{i,ij}$ within domain i for the interface between domains i and j. This is analogous to the 'diffusion-length' approach attempted previously, but we dispense with assumptions on the spatial profiles for c. The 'driving force' $\Delta c$ is expressed in terms of a difference between the average concentration and the unknown interfacial concentration $\Delta c_1 = \overline{c_1} - c_{1,x=l_1}$, and we use $$\delta_{1,12} = \frac{l_1}{2}$$

as a first approximation. We therefore have, using the constitutive equations (29)

$$N_{1,x=l_1} = -D(c_{1,x=l_1})\varepsilon_1^{b_1}\frac{\partial c_1}{\partial x_{x=l_1}} \approx D(c_{1,x=l_1})\varepsilon_1^{b_1}\left(\frac{\Delta c_1}{\delta_{1,12}}\right) = \quad (39)$$

$$D(c_{1,x=l_1})\varepsilon_1^{b_1}\left(\frac{\overline{c_1} - c_{1,x=l_1}}{\frac{l_1}{2}}\right)$$

On the separator side of the interface, we assume $$\delta_{2,12} = \frac{l_2}{2},$$

which we use for the flux approximation $$N_{2,x=l_1} = -D(c_{2,x=l_1})\varepsilon_2^{b_2}\frac{\partial c_2}{\partial x_{x=l_2}} \approx D(c_{2,x=l_1})\varepsilon_2^{b_2}\left(\frac{\Delta c_2}{\delta_{2,12}}\right) = \quad (40)$$

$$D(c_{2,x=l_1})\varepsilon_2^{b_2}\left(\frac{-\overline{c_2} + c_{2,x=l_1}}{\frac{l_2}{2}}\right)$$

An equivalent interpretation of the above flux approximations is that we have assumed that the concentration at the midpoint of the porous domain equal to the volume average. This approximation is mathematically equivalent to Gaussian integration with one point, accurate to $l_1^2$.

Substitution of the above approximations into the continuity conditions of equations (32) gives us $$D(c_{1,x=l_1})\varepsilon_1^{b_1}\left(\frac{\overline{c_1} - c_{1,x=l_1}}{\frac{l_1}{2}}\right) = D(c_{2,x=l_1})\varepsilon_2^{b_2}\left(\frac{-\overline{c_2} + c_{2,x=l_1}}{\frac{l_2}{2}}\right) \quad (41)$$

The interfacial concentration is now expressed in terms of tank averages as $$c_{12} = c_{1,x=l_1} = c_{2,x=l_1} = \left(\frac{\frac{\varepsilon_1^{b_1}}{l_1}\overline{c_1} + \frac{\varepsilon_2^{b_2}}{l_2}\overline{c_2}}{\frac{\varepsilon_1^{b_1}}{l_1} + \frac{\varepsilon_2^{b_2}}{l_2}}\right) \quad (42)$$

In general, we use the notation $v_{ij}$ to denote the value of a given variable v at the interface of domains i and j. An identical sequence of steps yields the concentration at the separator-negative interface as $$c_{23} = c_{2,x=l_1+l_2} = c_{3,x=l_1+l_2} = \left(\frac{\frac{\varepsilon_3^{b_3}}{l_3}\overline{c_3} + \frac{\varepsilon_2^{b_2}}{l_2}\overline{c_2}}{\frac{\varepsilon_3^{b_3}}{l_3} + \frac{\varepsilon_2^{b_2}}{l_2}}\right) \quad (43)$$

Substituting the values of interfacial concentrations back into the flux approximations allows us to express the interfacial fluxes in terms of tank-average variables. Thus, we have $$N_{12} = \frac{-2D(c_{12})(\overline{c_2} - \overline{c_1})}{\frac{l_1}{\varepsilon_1^{b_1}} + \frac{l_2}{\varepsilon_2^{b_2}}} \quad (44)$$

$$N_{23} = \frac{-2D(c_{23})(\overline{c_3} - \overline{c_2})}{\frac{l_2}{\varepsilon_2^{b_2}} + \frac{l_3}{\varepsilon_3^{b_3}}} \quad (45)$$

Equations (44) and (45) can thus be inserted into the volume-averaged forms (36)-(38) to obtain a system of Ordinary Differential Equations (ODEs). It is important to equate the approximations for the total flux, and not just the driving forces. This ensures true mass conservation.

In the three 'tanks', after substituting the known values of average pore-wall fluxes, we have $$\frac{d\overline{c_1}}{dt} = \frac{\frac{2D(c_{12})(\overline{c_2} - \overline{c_1})}{\frac{l_1}{\varepsilon_1^{b_1}} + \frac{l_2}{\varepsilon_2^{b_2}}}}{\varepsilon_1 l_1} + (1-t_+^0)\frac{i_{app}}{F\varepsilon_1 l_1} \quad (46)$$

-continued $$\frac{d\overline{c_2}}{dt} = \frac{\frac{-2D(c_{12})(\overline{c_2} - \overline{c_1})}{\frac{l_1}{\varepsilon_1^{b_1}} + \frac{l_2}{\varepsilon_2^{b_2}}} + \frac{2D(c_{23})(\overline{c_3} - \overline{c_2})}{\frac{l_2}{\varepsilon_2^{b_2}} + \frac{l_3}{\varepsilon_3^{b_3}}}}{\varepsilon_2 l_2} \quad (47)$$

$$\frac{d\overline{c_3}}{dt} = \frac{\frac{-2D(c_{23})(\overline{c_3} - \overline{c_2})}{\frac{l_2}{\varepsilon_2^{b_2}} + \frac{l_3}{\varepsilon_3^{b_3}}}}{\varepsilon_3 l_3} - (1 - t_+^0)\frac{i_{app}}{F\varepsilon_3 l_3} \quad (48)$$

As specified previously, a slight difference between this approach and others in literature is that it avoids the assumption of uniform reaction rate (given by the pore-wall flux) to solve the PDEs for concentration, but instead deals in average quantities. This allows the prediction of average concentration trends even when the constant pore-wall flux assumption is not applicable, with the flux approximations as the sole source of error. Inspection of equations (46)-(48) also suggests their decoupling from those for other electrochemical variables, indicating that they may be solved independently as an ODE system, the solutions of which may be used to compute other relevant quantities during post-processing. While all model equations may be simulated simultaneously throughout this disclosure, such a segregated approach may be computationally efficient in real-time control or resource-constrained environments and is enabled by the Tanks-in-Series model. Leaving the model in this form allows for the incorporation of nonlinear diffusivities.

The governing equation for electrolyte current is related to charge conservation in the electrolyte phase. Thus, we have $$-\frac{\partial i_{l,1}}{\partial x} = -Fa_1 j_1 \quad (49)$$

$$-\frac{\partial i_{l,2}}{\partial x} = 0$$

$$-\frac{\partial i_{l,3}}{\partial x} = -Fa_3 j_3$$

Where the constitutive equation for electrolyte current is given by a modified Ohm's law based on concentrated solution theory. Thus $$i_{l,1} = -\kappa(c_1)\varepsilon_1^{b_1}\frac{\partial \phi_{l,1}}{\partial x} + \frac{2RT(1 - t_+^0)}{F}\left(1 + \frac{\partial \ln f}{\partial \ln c_1}\right)\kappa(c_1)\varepsilon_1^{b_1}\frac{1}{c_1}\frac{\partial c_1}{\partial x} \quad (50)$$

$$i_{l,2} = -\kappa(c_2)\varepsilon_2^{b_2}\frac{\partial \phi_{l,2}}{\partial x} + \frac{2RT(1 - t_+^0)}{F}\left(1 + \frac{\partial \ln f}{\partial \ln c_2}\right)\kappa(c_2)\varepsilon_2^{b_2}\frac{1}{c_2}\frac{\partial c_2}{\partial x}$$

$$i_{l,3} = -\kappa(c_3)\varepsilon_3^{b_3}\frac{\partial \phi_{l,3}}{\partial x} + \frac{2RT(1 - t_+^0)}{F}\left(1 + \frac{\partial \ln f}{\partial \ln c_3}\right)\kappa(c_3)\varepsilon_3^{b_3}\frac{1}{c_3}\frac{\partial c_3}{\partial x}$$

The concentration-dependent ionic conductivity κ(c) is corrected by a tortuosity factor specific to each region.

Now, volume-averaging equation (49) is redundant, ultimately resulting in equation (21) due to the overall charge balance imposed by porous electrode theory. However, the interfacial boundary conditions for $i_{2,i}$ provide for the estimation of liquid phase ohmic effects. At the interface between the electrodes and separator, the entire current $i_{app}$ is carried by the liquid phase, and the solid-phase current density is zero. Using the constitutive equations (50), we therefore have, at the positive electrode-separator interface $$i_{l,1,x=l_1} = -\kappa(c_{1,x=l_1})\varepsilon_1^{b_1}\frac{\partial \phi_{l,1}}{\partial x} + \quad (51)$$

$$\frac{2RT(1 - t_+^0)}{F}v(c_{1,x=l_1})\kappa(c_{1,x=l_1})\varepsilon_1^{b_1}\frac{1}{c_{1,x=l_1}}\frac{\partial c_1}{\partial x} = i_{app}$$

$$i_{l,2,x=l_1} = -\kappa(c_{2,x=l_1})\varepsilon_2^{b_2}\frac{\partial \phi_{l,2}}{\partial x} +$$

$$\frac{2RT(1 - t_+^0)}{F}v(c_{2,x=l_1})\kappa(c_{2,x=l_1})\varepsilon_2^{b_2}\frac{1}{c_{2,x=l_1}}\frac{\partial c_2}{\partial x} = i_{app}$$

Where we have defined the thermodynamic factor as $$v(c_i) = 1 + \frac{\partial \ln f}{\partial \ln c_i}.$$

The tank-averaged equations for the electrolyte potential are now written as $$i_{l,1,x=l_1} = -\kappa(c_{1,x=l_1})\varepsilon_1^{b_1}\left(\frac{\phi_{l,x=l_1} - \overline{\phi_{l,1}}}{\frac{l_p}{2}}\right) + \quad (52)$$

$$\frac{2RT(1 - t_+^0)}{F}v(c_{1,x=l_1})\kappa(c_{1,x=l_1})\varepsilon_1^{b_1}\frac{1}{c_{1,x=l_1}}\left(\frac{c_{1,x=l_1} - \overline{c_1}}{\frac{l_p}{2}}\right) = i_{app}$$

$$i_{l,2,x=l_1} = -\kappa(c_{2,x=l_1})\varepsilon_2^{b_2}\left(\frac{\overline{\phi_{l,2}} - \phi_{l,x=l_1}}{\frac{l_s}{2}}\right) +$$

$$\frac{2RT(1 - t_+^0)}{F}v(c_{2,x=l_1})\kappa(c_{2,x=l_1})\varepsilon_2^{b_2}\frac{1}{c_{2,x=l_1}}\left(\frac{\overline{c_2} - c_{2,x=l_1}}{\frac{l_s}{2}}\right) = i_{app}$$

Where an approximation $$\frac{\partial \phi_{l,1}}{\partial x} \approx \frac{(\phi_{l,1,x=l_p} - \overline{\phi_{l,1}})}{\frac{l_p}{2}} \text{ and } \frac{\partial \phi_{l,2}}{\partial x} = \frac{(\phi_{l,2,x=l_p} - \overline{\phi_{l,2}})}{\frac{l_s}{2}},$$

analogous to equations (39) and (40) is made for the gradients of $\phi_{l,i}$, in terms of tank-average and interfacial values. Equating the interfacial current density results in equation (53), which can be solved in conjunction with continuity conditions to obtain the interfacial electrolyte potential.

$$-\varepsilon_1^{b_1}\left(\frac{\phi_{l,1,x=l_1} - \overline{\phi_{l,1}}}{\frac{l_1}{2}}\right) = -\varepsilon_2^{b_2}\left(\frac{\overline{\phi_{l,2}} - \phi_{l,2,x=l_1}}{\frac{l_2}{2}}\right) \quad (53)$$

Solving for $\phi_{l,12}$ gives us $$\phi_{l,12} = \phi_{l,1,x=l_1} = \phi_{l,2,x=l_1} = \left(\frac{\frac{\varepsilon_1^{b_1}}{l_1}\overline{\phi_{l,1}} + \frac{\varepsilon_2^{b_2}}{l_2}\overline{\phi_{l,2}}}{\frac{\varepsilon_1^{b_1}}{l_1} + \frac{\varepsilon_2^{b_2}}{l_2}}\right) \quad (54)$$

A similar form is obtained at the separator-negative electrode interface $$\phi_{l,23} = \phi_{l,2,x=l_1+l_2} = \phi_{l,3,x=l_1+l_2} = \left( \frac{\frac{\varepsilon_3^{b_3}}{l_3}\overline{\phi_{l,3}} + \frac{\varepsilon_2^{b_2}}{l_2}\overline{\phi_{l,2}}}{\frac{\varepsilon_3^{b_3}}{l_3} + \frac{\varepsilon_2^{b_2}}{l_2}} \right) \quad (55)$$

Equations (39)-(43) can now be combined with equations (51)-(55) to give us the algebraic equations governing electrolyte potential $$i_{app} = -2\kappa(c_{12})\left( \frac{\overline{\phi_{l,2}} - \overline{\phi_{l,1}}}{\frac{l_1}{\varepsilon_1^{b_1}} + \frac{l_2}{\varepsilon_2^{b_2}}} \right) + \quad (56)$$

$$\frac{4RT(1-t_+^0)}{F}\nu(c_{12})\kappa(c_{12})\frac{1}{c_{12}}\left( \frac{\overline{c_2} - \overline{c_1}}{\frac{l_1}{\varepsilon_1^{b_1}} + \frac{l_2}{\varepsilon_2^{b_2}}} \right) = i_{l,1,x=l_1}$$

$$i_{app} = -2\kappa(c_{23})\left( \frac{\overline{\phi_{l,3}} - \overline{\phi_{l,2}}}{\frac{l_3}{\varepsilon_3^{b_3}} + \frac{l_2}{\varepsilon_2^{b_2}}} \right) +$$

$$\frac{4RT(1-t_+^0)}{F}\nu(c_{23})\kappa(c_{23})\frac{1}{c_{23}}\left( \frac{\overline{c_3} - \overline{c_2}}{\frac{l_2}{\varepsilon_2^{b_2}} + \frac{l_3}{\varepsilon_3^{b_3}}} \right) = i_{l,3,x=l_1+l_2}$$

The final step in the model formulation is the specification of a reference potential. A convenient reference is the electrolyte potential at the interface between the separator and positive electrode. We thus set $\phi_{l,12}=0$. This modifies equation (54), and completes the DAE system for the Tank Model.

$$\phi_{l,12} = \left( \frac{\frac{\varepsilon_1^{b_1}}{l_1}\overline{\phi_{l,1}} + \frac{\varepsilon_2^{b_2}}{l_2}\overline{\phi_{l,2}}}{\frac{\varepsilon_1^{b_1}}{l_1} + \frac{\varepsilon_2^{b_2}}{l_2}} \right) = 0 \quad (57)$$

We can now assemble the complete Tanks-in-Series Model listed below in Table IV.

Solving the system of Table IV now allows the prediction of the cell voltage as $$V_{cell} = \overline{\phi_{s,1}} - \overline{\phi_{s,3}} \quad (58)$$

In using equation (58) to calculate cell voltage for the Tanks-in-Series Model, it is implicitly assumed that the solid phase potentials at the cell termini may be approximated by their respective electrode averages. In reality, the terminal potentials are determined via interfacial approximations for the constitutive equations (19) analogous to equations (52) for $\phi_{l,i}$. Accounting for this potential drop may be necessitated at high current densities, or for electrodes with poor electronic conductivity. In practice, $\sigma_{eff} \sim 50$ S/m and the $\phi_{s,i}$ gradients within the electrode are negligible. This can be seen by the following rough estimation for an aggressive $|i_{app}|=100$ A/m²

$$i_{app} \Box - \sigma_{eff}\frac{\overline{\phi_{s,1}} - \phi_{s,01}}{l_1/2} \quad (59)$$

$$\overline{\phi_{s,1}} - \phi_{s,01} = |-l_1 i_{app}/(2\sigma_{eff})| = 10^{-2}/2 \sim 0.005 \text{ V}$$

Thus, the upper limit of this solid phase ohmic drop is ~5 mV per electrode. This justifies the assumption of uniform $\phi_{s,i}$ for most situations of practical salience.

Table III lists the parameter values for a 1.78 Ah Nickel-Cobalt-Manganese (NCM)/graphite power cell, collated from various sources by Tanim et al. Electrolyte transport property correlations were taken from the work of Valøen and Reimers, and are listed in Table II. A modified value of $R_i=1$ μm was used for the particle radii, in order to ensure rapid diffusion with negligible gradients. The absence of solid phase diffusion limitations serves the practical purpose of ensuring the accuracy of our three-parameter model for solid phase transport even at relatively high discharge rates, based on the quantitative guidelines of Subramanian et al. This prevents numerical errors for solid phase discretization from confounding our analysis, which is focused on examining the accuracy of our Tanks-in-Series equations for the liquid phase.

The tanks-in-series may also be recast. Recalling the volume-averaged electrolyte equations (46)-(48) of the Tank Model, we have $$\frac{d\overline{c_1}}{dt} = \frac{\frac{2D(c_{12})(\overline{c_2} - \overline{c_1})}{\frac{l_1}{\varepsilon_1^{b_1}} + \frac{l_2}{\varepsilon_2^{b_2}}}}{\varepsilon_1 l_1} + (1 - t_+^0)\frac{i_{app}}{F\varepsilon_1 l_1} \quad (60)$$

$$\frac{d\overline{c_2}}{dt} = \frac{\frac{-2D(c_{12})(\overline{c_2} - \overline{c_1})}{\frac{l_1}{\varepsilon_1^{b_1}} + \frac{l_2}{\varepsilon_2^{b_2}}} + \frac{2D(c_{23})(\overline{c_3} - \overline{c_2})}{\frac{l_2}{\varepsilon_2^{b_2}} + \frac{l_3}{\varepsilon_3^{b_3}}}}{\varepsilon_2 l_2} \quad (61)$$

$$\frac{d\overline{c_3}}{dt} = \frac{\frac{-2D(c_{23})(\overline{c_3} - \overline{c_2})}{\frac{l_2}{\varepsilon_2^{b_2}} + \frac{l_3}{\varepsilon_3^{b_3}}}}{\varepsilon_3 l_3} - (1 - t_+^0)\frac{i_{app}}{F\varepsilon_3 l_3} \quad (62)$$

The above equations may be conveniently written as $$\frac{d\overline{c_1}}{dt} = \frac{K_{12}}{V_{l,1}}(\overline{c_2} - \overline{c_1}) + (1 - t_+^0)\frac{i_{app}}{FV_{l,1}} \quad (63)$$

$$\frac{d\overline{c_2}}{dt} = \frac{-K_{12}(\overline{c_2} - \overline{c_1}) + K_{23}(\overline{c_3} - \overline{c_2})}{V_{l,2}} \quad (64)$$

$$\frac{d\overline{c_3}}{dt} = \frac{-K_{23}}{V_{l,3}}(\overline{c_3} - \overline{c_2}) - (1 - t_+^0)\frac{i_{app}}{FV_{l,3}} \quad (65)$$

Where the governing equations have been expressed in terms of equivalent 'mass transfer' coefficients, volume and source terms. In the above equations, the $$K_{ij} = \frac{2D(c_{ij})}{\frac{l_i}{\varepsilon_i^{b_i}} + \frac{l_j}{\varepsilon_j^{b_j}}}$$

have units of mass transfer coefficient (m/s), and $V_{l,i}$ denotes the electrolyte volume (per unit area) in region i with units of length. The transport parameters in the electrolyte current balance (56) may also be grouped similarly $$i_{app} = -S_{12}(\overline{\phi_{l,2}} - \overline{\phi_{l,1}}) + \frac{2RT(1-t_+^0)}{F}S_{12}\left(\frac{\overline{c_2} - \overline{c_1}}{c_{12}}\right) \quad (66)$$

$$i_{app} = -S_{23}(\overline{\phi_{l,3}} - \overline{\phi_{l,2}}) + \frac{2RT(1-t_+^0)}{F}S_{23}\left(\frac{\overline{c_3} - \overline{c_2}}{c_{23}}\right)$$

Where, the thermodynamic factor $v(c_{ij})=1$ for simplicity. Here, $$S_{ij} = \frac{2\kappa(c_{ij})}{\frac{l_i}{\varepsilon_i^{b_i}} + \frac{l_j}{\varepsilon_j^{b_j}}}$$

have units of $S/m^2$. The lengths used in the flux approximation, which for this case is $$\frac{l_i}{2},$$

are present in the expressions for $K_{ij}$ and $S_{ij}$. Estimating these quantities is equivalent to deriving a suitable flux or gradient approximation. For constant diffusivity, the electrolyte concentration equations constitute a coupled linear system of Ordinary Differential Equations with constant coefficients. The form of these equations suggests a possible parameter estimation strategy in which the Tank Model is matched against experimental data by direct estimation of the 'consolidated' transfer coefficients. Variations due to concentration-dependent transport properties, or transients in which the 'steady state layer' is attained over a characteristic timescale comparable to the total discharge time can potentially be handled by estimating average values over the course of the process.

The full p2D model is used as the benchmark in evaluating the predictions of the Tanks-in-Series model. The p2D model was discretized and solved using coordinate transformation, model reformulation and orthogonal collocation techniques described in previous work. The number of collocation points in each region were adjusted to achieve numerical convergence of discharge curves at different current densities, ultimately selecting n=(7,3,7) Gauss-Legendre collocation points. Comparisons of the Tank Model with SPM are also reported, for which a Finite-Difference discretization with n=256 internal node points were employed. All DAE systems were consistently initialized, and solved using the dsolve function in Maple 2018. An absolute solver tolerance abserr=$10^{-8}$ was specified.

For evaluating computational performance, the discretized equations were solved in time using IDA, an Implicit Differential-Algebraic solver in ANSI-standard C language under BSD license. IDA is an efficient solver for initial value problems (IVP) for systems of DAEs, which is part of the SUNDIALS (SUite of Nonlinear and DIfferential/ALgebraic equation Solvers) package. The absolute solver tolerance was set to atol=$10^{-8}$ and a relative tolerance of rtol=$10^{-7}$ was specified.

All computations were performed on an Intel® Core™ i7-7700K processor with a clock speed of 4.2 GHz, 8 logical cores and 64 GB RAM.

The Tanks-in-Series model was simulated for galvanostatic discharge at C-rates of 1C, 2C, and 5C. In comparing the model predictions to the full p2D model, we seek to ascertain the accuracy of the Tanks-in-Series approximations, and to quantify its deviation from p2D as a function of applied current density. The results were also compared against curves from SPM, chiefly to illustrate improvement over commonly used fast physics-based models.

The cell voltage-time predictions of our Tanks-in-Series model (hereafter termed the 'Tank Model') were compared with SPM and the full p2D model. The agreement of all three models at 1C and 2C indicated relatively low liquid phase polarizations compared to other overpotentials, possibly due to the values of the Base Case parameters, which are those of a power-cell rated for higher discharge rates. Even so, there is a discernible improvement with the Tank Model. The improved accuracy of the tank model at 5C discharge is substantially more pronounced, particularly during the intermediate phase of the discharge process. The qualitative trends are identical for both the Tank Model and SPM, but the curves for the Tank Model appear shifted by nearly a constant value compared to SPM. This difference is due to the Tank Model's estimates of liquid phase ohmic drops and concentration overpotentials, which reduces error. The magnitude of these overpotentials increases with current density as characterized by the C-rate.

The increased accuracy of the Tank Model at 5C was proven in these tests, with the absolute error only slightly exceeding 20 mV, in contrast to >60 mV for SPM. A more than threefold reduction in RMSE is obtained at 5C due to the incorporation of the lumped equations for the electrolyte.

Despite the chemistry-specific considerations and limitations of the Tank Model equations, the Tank Model results in an RMSE of 14.3 mV even at 5C discharge rate, making it competitive in terms of error metrics for online applications. This error is expected to reduce even further based on the specific battery chemistries being considered, such as in the case of a negative electrode with slower kinetics and a more monotonic $U(c_j^{s,surf})$ curve, which is expected to result in an inherently more uniform reaction profile. This would further bolster the case for the Tank Model with its substantially improved computational efficiency.

The Tank Model was compared against SPM because of its substantial ubiquity in advanced BMS applications, as SPM has been the model of choice when physical detail is desired. In introducing the Tank Model, we seek to propose an alternative for various applications where SPM is substantially common. However, for additional perspective, the error metrics of the Tank Model were also considered relative to a recent version of the SPMe, which corrects SPM with electrolyte dynamics as mentioned previously. The representative values of electrolyte transport properties required by the SPMe formulation were evaluated at the initial electrolyte concentration.

The error metrics up to 3C discharge rate were determined. The substantial improvement in error in going from SPM to lumped electrolyte models was evident, particularly at 3C, where the RMSE reduction is nearly three-fold for SPMe. However, the Tank Model exhibits even lower error (13 mV vs. 35 mV). This suggests more accurate estimation of concentration overpotentials and liquid phase ohmic drops for the chosen parameters. The SPMe uses representative values, whereas the Tank Model only utilizes the evaluation of electrolyte transport properties at the interfaces. Consequently, the concentration-dependent transport properties can be included in an efficient manner. The expressions in SPMe may need to be rederived to account for these variations.

Computational times for the Tank Model are listed in Table V. For the Tank Model, each conservation law in the electrolyte phase is replaced by its volume-averaged form, while the solid phase in each electrode is replaced by 3 linear DAEs. The original ~200-1000 DAEs are thus replaced by 14 average conservation equations. This results in a 1C discharge curve being simulated in ~2 ms, in contrast to >1000 ms for a standard Finite Difference implementation. The computational speed of this model is comparable to fast SPM implementations. The Tank Model is also competitive with the state-of-the-art reformulated p2D model from our group, achieving up to an order of magnitude reduction in computation time. The mathematical similarity of the Tank Model to the reformulated model with n=(1,1,1) collocation prompts the question as to why the (1,1,1) reformulated model is not used instead of developing the Tank Model. This is because the proposed model is conservative and exhibited higher accuracy. In addition, it can be rewritten so as to contain fewer adjustable parameters compared to reformulated models. Increasing the accuracy and numerical convergence of reformulated models uses its ability to guarantee convergence for different chemistries, parameters and operating conditions by increasing the number of collocation points.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

TABLE I

Governing PDEs for the p2D model.

| Equations | Boundary Conditions |
|---|---|
| Positive Electrode (Region 1) | |
| $\varepsilon_1 \frac{\partial c_1}{\partial t} = \frac{\partial}{\partial x}\left[D(c_1)\varepsilon_1^{b_1} \frac{\partial c_1}{\partial x}\right] + a_1(1-t_+)j_1$ | $\frac{\partial c_1}{\partial x}\bigg|_{x=0} = 0$ <br> $\varepsilon_1^{b_1} \frac{\partial c_1}{\partial x}\bigg|_{x=l_1} = \varepsilon_2^{b_2} \frac{\partial c_2}{\partial x}\bigg|_{x=l_1}$ |
| $i_{l,1} = -\kappa(c_1)\varepsilon_1^{b_1} \frac{\partial \phi_{l,1}}{\partial x} + \frac{2RT(1-t_+^0)}{F}\left(1 + \frac{\partial \ln f}{\partial \ln c_1}\right)\kappa(c_1)\varepsilon_1^{b_1} \frac{1}{c_1} \frac{\partial c_1}{\partial x}$ | $\frac{\partial \phi_{l,1}}{\partial x}\bigg|_{1,x=0} = 0$ <br> $\varepsilon_1^{b_1} \frac{\partial \phi_{l,1}}{\partial x}\bigg|_{x=l_1} = \varepsilon_2^{b_2} \frac{\partial \phi_{l,2}}{\partial x}\bigg|_{x=l_1}$ |
| $\frac{\partial}{\partial x}\left[\sigma_{\mathit{eff},1} \frac{\partial \phi_{s,1}}{\partial x}\right] = a_1 F j_1$ | $\frac{\partial \phi_{l,1}}{\partial x}\bigg|_{x=0} = -\frac{i_{app}}{\sigma_{\mathit{eff},1}}$ <br> $\frac{\partial \phi_{l,1}}{\partial x}\bigg|_{x=l_1} = 0$ |
| $\frac{\partial c_1^s}{\partial t} = \frac{1}{r^2} \frac{\partial}{\partial r}\left[r^2 D_1^s \frac{\partial c_1^s}{\partial x}\right]$ | $\frac{\partial c_1^s}{\partial r}\bigg|_{r=0} = 0$ <br> $\frac{\partial c_1^s}{\partial r}\bigg|_{r=R_1} = -\frac{j_1}{D_1^s}$ |
| Separator (Region 2) | |
| $\varepsilon_2 \frac{\partial c_2}{\partial t} = \frac{\partial}{\partial x}\left[D(c_2) \frac{\partial c_2}{\partial x}\right]$ | $c_1\big|_{x=l_1} = c_2\big|_{x=l_1}$ <br> $c_2\big|_{x=l_1+l_2} = c_3\big|_{x=l_1+l_2}$ |
| $i_{l,2} = -\kappa(c_2)\varepsilon_2^{b_2} \frac{\partial \phi_{l,2}}{\partial x} + \frac{2RT(1-t_+^0)}{F}\left(1 + \frac{\partial \ln f}{\partial \ln c_2}\right)\kappa(c_2)\varepsilon_2^{b_2} \frac{1}{c_2} \frac{\partial c_2}{\partial x}$ | $\phi_{l,1}\big|_{x=l_1} = \phi_{l,2}\big|_{x=l_1}$ <br> $\phi_{l,2}\big|_{x=l_1+l_2} = \phi_{l,3}\big|_{x=l_1+l_2}$ |

TABLE I-continued

Governing PDEs for the p2D model.

| Equations | Boundary Conditions |
|---|---|
| Negative Electrode (Region 3) | |

$$\varepsilon_3 \frac{\partial c_3}{\partial t} = \frac{\partial}{\partial x}\left[D(c_3)\frac{\partial c_3}{\partial x}\right] + a_3(1 - t_+)j_3$$

$$\frac{\partial c_3}{\partial x}\Big|_{x=l_1+l_2+l_3} = 0$$

$$\varepsilon_2^{b_2} \frac{\partial c_2}{\partial x}\Big|_{x=l_1+l_2} = \varepsilon_3^{b_3}\frac{\partial c_3}{\partial x}\Big|_{x=l_1+l_2}$$

$$i_{l,3} = -\kappa(c_3)\varepsilon_3^{b_3}\frac{\partial \phi_{l,3}}{\partial x} + \frac{2RT(1-t_+^0)}{F}\left(1 + \frac{\partial \ln f}{\partial \ln c_3}\right)\kappa(c_3)\varepsilon_3^{b_3}\frac{1}{c_3}\frac{\partial c_3}{\partial x}$$

$$\phi_{l,3}\Big|_{x=l_1+l_2+l_3} = 0$$

$$\varepsilon_2^{b_2}\frac{\partial \phi_{l,2}}{\partial x}\Big|_{x=l_1+l_2} = \varepsilon_3^{b_3}\frac{\partial \phi_{l,3}}{\partial x}\Big|_{x=l_1+l_2}$$

$$\frac{\partial}{\partial x}\left[\sigma_{eff,3}\frac{\partial \phi_{s,3}}{\partial x}\right] = a_3 F j_3$$

$$\frac{\partial \phi_{s,3}}{\partial x}\Big|_{x=l_1+l_2} = 0$$

$$\frac{\partial \phi_{s,3}}{\partial x}\Big|_{x=l_1+l_2+l_3} = -\frac{i_{app}}{\sigma_{eff,3}}$$

$$\frac{\partial c_3^s}{\partial t} = \frac{1}{r^2}\frac{\partial}{\partial r}\left[r^2 D_3^s \frac{\partial c_3^s}{\partial r}\right]$$

$$\frac{\partial c_3^s}{\partial r}\Big|_{r=0} = 0$$

$$\frac{\partial c_3^s}{\partial r}\Big|_{r=R_3} = -\frac{j_3}{D_3^s}$$

TABLE II

Additional constitutive equations for the p2D model.

$$j_1 = k_1 c_1^{\alpha_{a,1}}\left(c_1^{s,max} - c_1^{s,surf}\right)^{\alpha_{a,1}}\left(c_1^{x,surf}\right)^{\alpha_{c,1}}\left(\exp\left(\frac{\alpha_{a,1}F\eta_1}{RT}\right) - \exp\left(\frac{-\alpha_{c,1}F\eta_1}{RT}\right)\right)$$

$$j_3 = k_3 c_3^{\alpha_{a,3}}\left(c_3^{s,max} - c_3^{s,surf}\right)^{\alpha_{a,3}}\left(c_3^{s,surf}\right)^{\alpha_{c,3}}\left(\exp\left(\frac{\alpha_{a,3}F\eta_3}{RT}\right) - \exp\left(\frac{-\alpha_{c,3}F\eta_3}{RT}\right)\right)$$

$$\kappa(c_i) = 1 \times 10^{-4} c_i \begin{bmatrix} (-10.5 + 0.0740T - 6.96 \times 10^{-5}T^2) + \\ c_i(0.668 - 0.0178T + 2.8 \times 10^{-5}T^2) + \\ c_i^2(0.494 - 8.86 \times 10^{-4}T^2) \end{bmatrix}^2, i \in \{1, 2, 3\}$$

$$\sigma_{eff,i} = \sigma_i(1 - \varepsilon_i - \varepsilon_{f,i}), i \in \{1, 3\}$$

$$D(c_i) = 0.0001 \times 10^{-\left[4.43 + \frac{54}{T - 229 - 0.005c_i}\right] - 0.00022 c_i}, i \in \{1, 2, 3\}$$

$$a_i = \frac{3}{R_i}(1 - \varepsilon_i - \varepsilon_{f,i}), i = 1, 2, 3$$

$$U_p = -10.72\theta_p^4 + 23.88\theta_p^3 - 16.77\theta_p^2 + 2.595\theta_p + 4.563$$

$$\theta_p = \frac{c_1^{s,surf}}{c_1^{s,max}}$$

$$U_n = 0.1493 + 0.8493 e^{-61.79\theta_n} + 0.3824 e^{-665.8\theta_n} - e^{39.42\theta_n - 41.92} - 0.03131 \tan^{-1}(25.59\theta_n - 4.099) - 0.009434 \tan^{-1}(32.49\theta_n - 15.74)$$

$$\theta_p = \frac{c_3^{s,surf}}{c_3^{s,max}}$$

$$(1 - t_+^0)\left(1 + \frac{\partial \ln f}{\partial \ln c_i}\right) = 0.601 - 7.5894 \times 10^{-3} c_i^{0.5} + 3.1053 \times 10^{-5}(2.5236 - 0.0052T)c_i^{1.5}, i \in \{1, 2, 3\}$$

TABLE III

Base case model parameters (constant values)

| Symbol | Parameter | Negative Electrode | Separator | Positive Electrode | Units |
|---|---|---|---|---|---|
| $\varepsilon_i$ | Porosity | 0.3 | 0.4 | 0.3 | |
| $\varepsilon_{fi}$ | Electrode filler fraction | 0.038 | | 0.12 | |

TABLE III-continued

Base case model parameters (constant values)

| Symbol | Parameter | Negative Electrode | Separator | Positive Electrode | Units |
|---|---|---|---|---|---|
| $b_i$ | Bruggeman tortuosity correction | 1.5 | 1.5 | 1.5 | |
| $a_i$ | Particle surface area per unit volume | 1740000 | | 1986000 | $m^2/m^3$ |
| $c_i^{s,\,max}$ | Maximum particle phase concentration | 31080 | | 51830 | $mol/m^3$ |
| $c_i^{s,\,0}$ | Initial particle phase concentration | 24578 | | 18645 | $mol/m^3$ |
| $c_0$ | Initial electrolyte concentration | | 1200 | | $mol/m^3$ |
| $D_i^s$ | Solid phase diffusivity | $1.4 \times 10^{-14}$ | | $2.0 \times 10^{-14}$ | $m^2/s$ |
| $k_i$ | Electrode reaction rate constant | $6.626 \times 10^{-10}$ | | $2.405 \times 10^{-10}$ | $m^{2.5}/(mol^{0.5}s)$ |
| $\alpha_{a,\,i}$ | Electrode reaction anodic coefficient | 0.5 | | 0.5 | |
| $\alpha_{c,\,i}$ | Electrode reaction cathodic coefficient | 0.5 | | 0.5 | |
| $l_i$ | Electrode thickness | $40 \times 10^{-6}$ | $25 \times 10^{-6}$ | $36.55 \times 10^{-6}$ | m |
| $R_i$ | Characteristic particle radius | $10^{-6}$ | | $10^{-6}$ | m |
| $t_+^0$ | Li+ transference number | | 0.38 | | |
| $\sigma_i$ | Electronic conductivity | 100 | | 100 | S/m |
| T | Temperature | | 298.15 | | K |
| $i_{app}$ | Current Density (1 C) | | −17.54 | | $A/m^2$ |

TABLE IV

Governing Equations of the Tanks-in-Series Model

Positive Electrode (Region 1)

$$\frac{d\overline{c_1}}{dt} = \frac{\frac{2D(c_{12})(\overline{c_2} - \overline{c_1})}{\frac{l_1}{\varepsilon_1^{b_1}} + \frac{l_2}{\varepsilon_2^{b_2}}}}{\varepsilon_1 l_1} + \left(1 - t_+^0\right) \frac{i_{app}}{F\varepsilon_1 l_1}$$

$$i_{app} = -2\kappa(c_{12}) \left( \frac{\overline{\phi_{l,2}} - \overline{\phi_{l,1}}}{\frac{l_1}{\varepsilon_1^{b_1}} + \frac{l_2}{\varepsilon_2^{b_2}}} \right) + \frac{4RT(1 - t_+^0)}{F} \nu(c_{12})\kappa(c_{12}) \frac{1}{c_{12}} \left( \frac{\overline{c_2} - \overline{c_1}}{\frac{l_1}{\varepsilon_1^{b_1}} + \frac{l_2}{\varepsilon_2^{b_2}}} \right)$$

$$\frac{d\overline{c_1^{s,avg}}}{dt} = -3\frac{\overline{j_1}}{R_1}$$

$$\frac{d\overline{q_1^{avg}}}{dt} = -30\frac{D_1^s}{R_1^2}\overline{q_1^{avg}} - \frac{45}{2}\frac{\overline{j_1}}{R_1^2}$$

$$35\frac{D_1^s}{R_1}\left[\overline{c_1^{s,avg}} - \overline{c_1^{s,avg}}\right] - 8D_1^s\overline{q_1^{avg}} = -\overline{j_1}$$

$$\frac{i_{app}}{Fa_1 l_1} = k_1 (\overline{c_1})_1^{\alpha_{c,1}} \left( c_1^{s,max} - \overline{c_1^{s,surf}} \right)^{\alpha_{a,1}} (\overline{c_1^{s,surf}})^{\alpha_{c,1}} \left( \exp\left(\frac{\alpha_{a,1} F \overline{\eta_1}}{RT}\right) - \exp\left(\frac{-\alpha_{c,1} F \overline{\eta_1}}{RT}\right) \right)$$

$$\overline{\eta_1} = \overline{\phi_{s,1}} - \overline{\phi_{l,1}} - U(\overline{c_1^{s,surf}})$$

Separator (Region 2)

$$\frac{d\overline{c_2}}{dt} = \frac{-\frac{2D(c_{12})(\overline{c_2} - \overline{c_1})}{\frac{l_1}{\varepsilon_1^{b_1}} + \frac{l_2}{\varepsilon_2^{b_2}}} + \frac{2D(c_{23})(\overline{c_3} - \overline{c_2})}{\frac{l_2}{\varepsilon_2^{b_2}} + \frac{l_3}{\varepsilon_3^{b_3}}}}{\varepsilon_2 l_2}$$

$$\phi_{l,12} = \left( \frac{\frac{\varepsilon_1^{b_1}}{l_1}\overline{\phi_{l,1}} + \frac{\varepsilon_2^{b_2}}{l_2}\overline{\phi_{l,2}}}{\frac{\varepsilon_1^{b_1}}{l_1} + \frac{\varepsilon_2^{b_2}}{l_2}} \right) = 0$$

TABLE IV-continued

Governing Equations of the Tanks-in-Series Model

Negative Electrode (Region 3)

$$\frac{d\overline{c_3}}{dt} = \frac{\frac{-2D(c_{23})(\overline{c_3} - \overline{c_2})}{\frac{l_2}{\varepsilon_2^{b_2}} + \frac{l_3}{\varepsilon_3^{b_3}}}}{\varepsilon_3 l_3} - (1 - t_+^0)\frac{i_{app}}{\varepsilon_3 l_3}$$

$$i_{app} = -2\kappa(c_{23})\left(\frac{\overline{\phi_{l,3}} - \overline{\phi_{l,2}}}{\frac{l_3}{\varepsilon_3^{b_3}} + \frac{l_2}{\varepsilon_2^{b_2}}}\right) + \frac{4RT(1 - t_+^0)}{F}\nu(c_{23})\kappa(c_{23})\frac{1}{c_{23}}\left(\frac{\overline{c_3} - \overline{c_2}}{\frac{l_2}{\varepsilon_2^{b_2}} + \frac{l_3}{\varepsilon_3^{b_3}}}\right)$$

$$\frac{d\overline{c_3^{s,avg}}}{dt} = -3\frac{\overline{j_3}}{R_3}$$

$$\frac{d\overline{q_3^{avg}}}{dt} = -30\frac{D_3^s}{R_3^2}\overline{q_3^{avg}} - \frac{45}{2}\frac{\overline{j_3}}{R_3^2}$$

$$35\frac{D_3^s}{R_1}\left[\overline{c_3^{s,surf}} - \overline{c_3^{s,avg}}\right] - 8D_3^s\overline{q_3^{avg}} = -\overline{j_3}$$

$$\frac{-i_{app}}{Fa_3 l_3} = k_3(\overline{c_3})^{\alpha_{a,3}}\left(c_3^{s,max} - \overline{c_3^{s,surf}}\right)^{\alpha_{a,3}}(\overline{c_3^{s,surf}})^{\alpha_{c,3}}\left(\exp\left(\frac{\alpha_{a,3}F\overline{\eta_3}}{RT}\right) - \exp\left(\frac{-\alpha_{c,3}F\overline{\eta_3}}{RT}\right)\right)$$

$$\overline{\eta_3} = \overline{\phi_{s,3}} - \overline{\phi_{l,3}} - U(\overline{c_3^{s,surf}})$$

TABLE V

Representative computational performance metrics for the Tank Model.

| Model and Implementation | Number of DAEs | Computation time (ms)* |
| --- | --- | --- |
| p2D-Finite Difference (50, 35, 50) | 986 | 1493 |
| p2D-Reformulated | 30-150 | 5-20 |
| Tank Model | 15** | 2.1 |

*Average of N = 3 simulation runs for a 1 C discharge. It must be noted that the simulation time and memory consumption is a strong function of the computing environment as well as error tolerances for both initialization and simulation.
**Including the equation for cell voltage

List of Symbols

Dependent Variables

| | |
| --- | --- |
| C | Electrolyte Concentration |
| $c^s$ | Solid Phase Concentration |
| $\phi_l$ | Liquid Phase Potential |
| $\phi_s$ | Solid Phase Potential |
| $V_{cell}$ | Cell Voltage |
| j | Pore-wall flux |
| N | Electrolyte molar flux |

Other Superscripts

| | |
| --- | --- |
| surf | Pertaining to the surface of the particle in the solid phase |
| — | Pertaining to the average over the volume of a porous domain |
| s, avg | Pertaining to the average over the volume of the solid particle |

Other Subscripts

| | |
| --- | --- |
| i | Pertaining to region i where i ∈ {1, 2, 3} |
| ij | Pertaining to the interface between regions i and j, where i, j ∈ {1, 2, 3} |
| i, ij | Pertaining to the interface between regions i and j on the side of region i where i, j ∈ {1, 2, 3} |

The invention claimed is:

1. A battery management system, comprising:
   a connector for electrically coupling a battery to the battery management system;
   at least one sensor configured to detect a battery state;
   a programmable chip configured to control at least one of charging and discharging of the battery; and
   a controller device configured to:
   receive at least one battery state from the at least one sensor;
   provide the at least one battery state as input to a tanks-in-series model that represents the battery; and
   provide at least one output of the tanks-in-series model to the programmable chip for controlling at least one of charging and discharging of the battery.

2. The battery management system of claim 1, wherein the tanks-in-series model includes:
   a tank model that represents an anode of the battery;
   a tank model that represents a separator of the battery; and
   a tank model that represents a cathode of the battery.

3. The battery management system of claim 2, wherein each tank model includes a volume-averaged representation of a P2D model of a corresponding domain.

4. The battery management system of claim 3, wherein the tanks-in-series model is derived by:
   integrating a pseudo 2-dimensional (P2D) model representation over a volume of each domain; and
   approximating interfacial fluxes between the domains, wherein a corresponding gradient is expressed as an average value minus an interfacial value of a dependent variable over a length scale.

5. The battery management system of claim 4, wherein the derivation of the tanks-in-series model further includes determining the interfacial values in a manner that preserves mass and charge conservation between each tank model.

6. The battery management system of claim 4, wherein integrating the P2D model representation over the volume of each domain results in a set of volume-averaged quantities with temporal evolution of each averaged variable expressed as an overall balance comprising approximated internal source terms and interfacial fluxes.

7. The battery management system of claim 1, wherein the at least one battery state includes at least one of a terminal voltage of the battery and a surface temperature of the battery.

8. The battery management system of claim 1, wherein the output includes at least one of a state of charge and a state of health of the battery.

9. A method of managing at least one of charging and discharging of a battery, the method comprising:
receiving, by a controller device, at least one battery state of the battery from at least one sensor;
providing, by the controller device, the at least one battery state as input to a tanks-in-series model that represents the battery; and
controlling, by the controller device, at least one of charging or discharging of the battery by using at least one output of the tanks-in-series model to determine at least one of a current or a voltage for use in the at least one of charging or discharging of the battery;
wherein the tanks-in-series model includes:
a tank model that represents an anode of the battery;
a tank model that represents a separator of the battery; and
a tank model that represents a cathode of the battery.

10. The method of claim 9, wherein
the tank model that represents the anode of the battery includes a volume-averaged representation of a concentration of lithium ions and potential in an electrolyte of the anode;
the tank model that represents the separator of the battery includes a volume-averaged representation of a concentration of lithium ions and potential in an electrolyte of the separator; and
the tank model that represents the cathode of the battery includes a volume-averaged representation of a concentration of lithium ions and potential in an electrolyte of the cathode.

11. The method of claim 10, wherein each tank model includes a volume-averaged representation of a pseudo 2-dimensional (p2D) model of a corresponding domain.

12. The method of claim 11, wherein the tanks-in-series model is derived by:
integrating a p2D model representation over a volume of each domain; and
approximating interfacial fluxes between the domains, wherein a corresponding gradient is expressed as an average value minus an interfacial value of a dependent variable over a length scale.

13. The method of claim 12, wherein the derivation of the tanks-in-series model further includes determining the interfacial values in a manner that preserves mass and charge conservation between each tank model.

14. The method of claim 12, wherein integrating the p2D model representation over the volume of each domain results in a set of volume-averaged quantities with temporal evolution of each averaged variable expressed as an overall balance comprising approximated internal source terms and interfacial fluxes.

15. The method of claim 9, wherein the at least one battery state includes at least one of a terminal voltage of the battery and a surface temperature of the battery.

16. The method of claim 9, wherein the output includes at least one of a state of charge and a state of health of the battery.

17. A computer-implemented method of deriving a model for controlling at least one of charging and discharging a battery, the method comprising:
integrating, by a computing device, pseudo 2-dimensional (p2D) model representations over volumes of a cathode domain of the battery, an anode domain of the battery, and a separator domain of the battery;
approximating, by the computing device, interfacial fluxes between the domains, wherein a corresponding gradient is expressed as an average value minus an interfacial value of a dependent variable over a length scale to create a tanks-in-series representation of the battery; and
providing, by the computing device, the tanks-in-series representation of the battery as the model for controlling at least one of charging and discharging of the battery.

18. The computer-implemented method of claim 17, wherein creating the tanks-in-series representation of the battery includes determining, by the computing device, the interfacial values in a manner that preserves mass and charge conservation between each domain of the battery.

19. The computer-implemented method of claim 17, wherein integrating the p2D model representations over the volumes of the domains results in a set of volume-averaged quantities with temporal evolution of each averaged variable expressed as an overall balance comprising approximated internal source terms and interfacial fluxes.

20. The computer-implemented method of claim 17, wherein the model accepts at least one of a terminal voltage of the battery and a surface temperature of the battery as input, and wherein the model outputs at least one of a state of charge of the battery and a health of the battery.

* * * * *